(12) United States Patent
Höchsmann et al.

(10) Patent No.: US 10,286,571 B2
(45) Date of Patent: May 14, 2019

(54) 3D PRINTER 3D PRINTER, ARRANGEMENT AND ADDITIVE MANUFACTURING PROCESS

(71) Applicant: ExOne GmbH, Gersthofen (DE)

(72) Inventors: Rainer Höchsmann, Langenneufnach (DE); Alexander Müller, Diedorf-Vogelsang (DE); Sven Klaua, Augsburg (DE)

(73) Assignee: ExOne GmbH, Gersthofen (DE)

( * ) Notice: Subject to any disclaimer, the term of this patent is extended or adjusted under 35 U.S.C. 154(b) by 257 days.

(21) Appl. No.: 15/506,317

(22) PCT Filed: Aug. 26, 2015

(86) PCT No.: PCT/EP2015/069505
§ 371 (c)(1),
(2) Date: Feb. 24, 2017

(87) PCT Pub. No.: WO2016/030405
PCT Pub. Date: Mar. 3, 2016

(65) Prior Publication Data
US 2018/0169894 A1    Jun. 21, 2018

(30) Foreign Application Priority Data

Aug. 29, 2014   (DE) .................. 10 2014 112 447

(51) Int. Cl.
*B28B 1/00*   (2006.01)
*B29C 64/165*   (2017.01)
(Continued)

(52) U.S. Cl.
CPC .............. *B28B 1/001* (2013.01); *B28B 1/004* (2013.01); *B29C 64/165* (2017.08); *B29C 64/20* (2017.08);
(Continued)

(58) Field of Classification Search
CPC ....... B28B 1/001; B28B 1/004; B29C 64/245; B29C 64/20; B29C 64/165; B33Y 30/00; B33Y 10/00
See application file for complete search history.

(56) References Cited

U.S. PATENT DOCUMENTS

2013/0004607 A1* 1/2013 Hoechsmann ........ B22F 3/1055
425/112
2016/0279705 A1* 9/2016 Mironets ................ B33Y 30/00
(Continued)

FOREIGN PATENT DOCUMENTS

DE    102009036153 A1 *  2/2011  ............. B29C 64/00

*Primary Examiner* — Nahida Sultana
(74) *Attorney, Agent, or Firm* — Thomas Lizzi

(57) ABSTRACT

A 3D printer 100 is described, which is configured to build up a three-dimensional component in layers by forming layers of particulate construction material lying one upon each other and by selectively solidifying a partial region of the respective construction material layer. The 3D printer 100 is configured to simultaneously build up one or more first three-dimensional components in a first construction space B1, which is arranged in the 3D printer, and one or more second three-dimensional components in a second construction space B2 which is arranged adjacent to the first construction space at a horizontal distance therefrom in the 3D printer.

15 Claims, 17 Drawing Sheets

(51) Int. Cl.
*B29C 64/245* (2017.01)
*B33Y 10/00* (2015.01)
*B33Y 30/00* (2015.01)
*B29C 64/20* (2017.01)

(52) U.S. Cl.
CPC ............ *B29C 64/245* (2017.08); *B33Y 10/00* (2014.12); *B33Y 30/00* (2014.12)

(56) References Cited

U.S. PATENT DOCUMENTS

| | | | |
|---|---|---|---|
| 2017/0072471 A1* | 3/2017 | Welch | B22F 1/02 |
| 2018/0215103 A1* | 8/2018 | Herzog | B22F 3/1055 |
| 2018/0222117 A1* | 8/2018 | Herzog | B33Y 10/00 |
| 2018/0293476 A1* | 10/2018 | Gold | B22F 3/1055 |
| 2018/0326656 A1* | 11/2018 | Herzog | B33Y 30/00 |

* cited by examiner

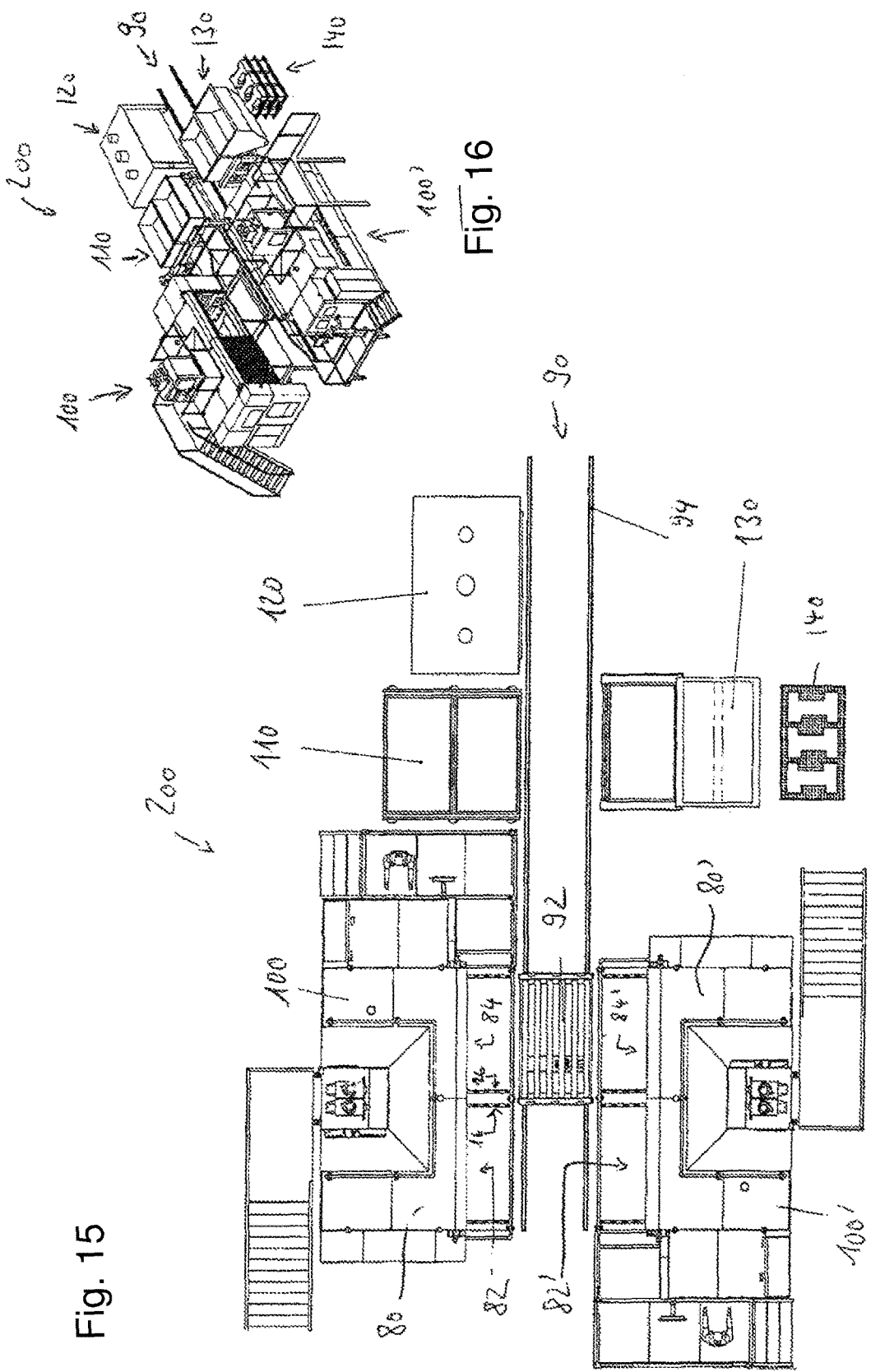

3D PRINTER 3D PRINTER, ARRANGEMENT AND ADDITIVE MANUFACTURING PROCESS

The present invention relates to a 3D printer, a 3D printer arrangement having at least one such 3D printer and a generative manufacturing process.

Various generative manufacturing processes (and consequently various types of 3D printers) are known.

Some generative manufacturing processes have the following steps in common:

(1) First, particulate material is applied over the entire surface of a construction field, so as to form a layer of unsolidified particulate material.

(2) The applied layer of unsolidified particulate material is selectively solidified in a predetermined partial area, for example by selectively printing a treatment agent, for example a binder (alternatively, for example, by laser sintering).

(3) Steps (1) and (2) are repeated to manufacture a desired component. For this purpose, a construction platform on which the component is built up in layers may, for example, be lowered by respectively one layer thickness before a new layer is applied over the entire surface (alternatively, the coating device and the printing device may, for example, be raised by respectively one layer thickness).

(4) Finally, the manufactured component which is supported and surrounded by loose, unsolidified particulate material may be unpacked.

The construction space in which the component or the components is/are manufactured may, for example, be defined by a so-called construction box (also referred to as "job box"). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may for example at least contribute to forming the construction space. An upper area of the construction space may, for example, be referred to as construction field. An example of such a construction box is, for example, described in DE 10 2009 056 696 A1.

A coating device arrangement having a coating device (also referred to as a "recoater") is normally used in the above step (1). Various coating device arrangements are known for use in 3D printers, by means of which a particulate construction material may be applied to the construction field (also referred to as construction surface or construction area) in the form of a uniform layer over the entire surface.

One type of coating device arrangement uses a roller (short: "roller coating device") in front of which first an amount of particulate construction material is put down and which is then horizontally moved across the construction field to apply the particulate construction material in the form of a uniform layer onto the construction field. In this respect, the roller may be rotated opposite to the moving direction. Coating device arrangements with great lengths are difficult to realize using a roller coating device.

Another kind of coating device arrangement (a so-called coating device arrangement having a "container coating device", for example a "slot coating device") uses a coating device with a container which is displaceable across a construction field and defines an inner cavity for receiving particulate construction material which leads to an opening for outputting the particulate construction material onto the construction field. The coating device may be elongate, for example to span or to cover the length or width of a rectangular construction field. The opening may then be provided as a longitudinal slot. The coating device can thus be moved horizontally across the construction field and at the same time output particulate construction material from the opening onto the construction field to thereby apply a uniform layer over the entire surface of the construction field.

In the above step (2), a printing device having a print head may for example be used, which applies a treatment agent in a controlled way onto a subarea of the construction material layer applied before. The treatment agent contributes to a solidification of the construction material layer in the subarea. For example, the treatment agent may be a binder, for example a binder component of a multicomponent binder.

Alternatively, a laser may, for example, be used in the above step (2) to solidify a subarea of the construction material layer applied previously, for example by sintering or melting the construction material in the subarea.

Particulate construction material within the meaning of this application may be understood as a construction material comprising at least one kind of particulate material (for example (grains of) sand, for example foundry sand, and/or metal particles and/or particles of synthetic material). Several different types of particulate material may be included in the construction material as well, such as a mixture of new sand and recycled sand or a mixture of fine sand and coarse sand or a mixture of two different types of sand. Moreover, the construction material may comprise at least one liquid component, for example a binder component, for example an activator, and/or one or more solid and/or liquid additives. In case that the construction material contains a binder component, another binder component, such as furan resin, may selectively be printed onto a previously applied construction material layer by means of a printing device, so as to solidify this layer in a predetermined area. Depending on the component to be manufactured, for example a casting mold or a foundry core, a construction material composition specifically prepared for this purpose may be used. In this respect, the construction material composition may be defined by the number of components used as well as by the respective type and the respective share of components contained in the construction material (mixture).

A 3D printer having two construction boxes is already known from the above-mentioned document. However, the 3D printer can always receive only one of the two construction boxes and therefore can always perform only one construction job (=generative manufacturing of one or more components in an assigned construction space). However, the two construction boxes are able to reduce the period of time between a first construction job and a second construction job, during which the plant or the printer is out of operation or does not print (for example to remove the construction box, to unpack the pieces contained therein and to prepare the construction box for the next construction job, etc.).

DE 102009036153 A1 discloses a device for generatively manufacturing three-dimensional formed parts of powdery construction material by introducing radiation energy, having a construction space which is divided in two construction space portions, wherein the construction space portions respectively receive a swap container, wherein the device is configured as an open portal open on both sides, wherein the swap containers can be loaded and/or removed from both open portal sides or can be fed through the portal, and wherein swap containers are container-like arrangements which include a construction platform that can be lowered, onto which powder can be coated in layers, and which are additionally provided with a powder handling arrangement, i.e. comprise a powder storing tank, a coating device and a powder overflow tank.

It may be considered as an object of the present invention to provide a 3D printer and a generative manufacturing method which enable to increase the output.

The present invention provides a 3D printer according to claim 1, a 3D printer arrangement according to claim 15 having at least one such 3D printer, and a generative manufacturing process according to claim 17. Further embodiments according to the invention are described in the respective dependent claims.

By way of illustration, according to various embodiments of the invention, the capacity and consequently also the output of the 3D printer may be increased as the manufacturing is not limited to a single construction space but as, if required, it is possible to simultaneously manufacture in two (or more) construction spaces using the 3D printer, i.e. to simultaneously perform two (or more) construction jobs using the 3D printer.

By way of illustration, according to various embodiments of the invention, the subdivision into a first and a second construction space instead of providing a single, comparatively large construction space, allows that the quality of the components to be manufactured may be maintained appropriately (i.e. that the quality does not decline as the capacity or the output increase), for example at justifiable costs and/or a justifiable complexity. In this respect, it should be considered that the respective length that a coating device arrangement or printing device may span continuously without a decline in quality of the component (for example as a result of a deflection of a coating device component, such as a coating device blade for stroking output construction material) is limited in practice (in particular, at justifiable costs and/or justifiable complexity). By way of illustration, because of the subdivision into a first and a second construction space the coating device arrangement may also be segmented correspondingly for example. Using several coating devices for a single, large construction space may in contrast be a problem as it is then no longer possible or at least highly difficult to apply a uniform layer (especially between the two coating devices).

By way of illustration, according to various embodiments of the invention, the subdivision into a first and a second construction space instead of providing a single, comparatively large construction space, further allows that the increase in capacity and/or output is not at the cost of manageability/handling, as two separate construction spaces (for example formed by two separate construction boxes) are significantly easier to handle than one large construction space. For example, unpacking the components from a large construction space may be a problem insofar as an operator of the plant might be unable to reach components arranged in the middle of the construction space without using tools, whereas two separate construction spaces may allow an ergonomic unpacking of all components from the respective construction space.

According to various embodiments of the invention, the first construction job to be performed in the first construction space and the second construction job to be performed in the second construction space may be performed comparatively fast as a result of a smart arrangement of the coating device arrangement and/or printing device, for example with reasonable effort and/or at reasonable costs.

Compared to an arrangement with two (or more) separate 3D printers providing a respective construction space in which a respective construction job is performed, the 3D printer having two (or more) construction spaces according to the invention may increase the output at reasonable costs, as for example a common/shared housing, a common frame structure, a common control or a common control cabinet, a common print head, a common coating device feeding device, etc. may be used (for example one or more or all of said common components), i.e. a plurality of components may be saved which would otherwise have to be provided twice (or a number of times).

According to various embodiments, a 3D printer is configured to build up a three-dimensional component, for example a casting mold or a foundry core, in layers, by forming layers of particulate construction material, for example containing sand particles, lying one upon the other and by selectively solidifying a partial area of the respective construction material layer.

In this respect, the 3D printer is configured (for example formed and/or designed and/or structured and/or programmed) to build up one or more first three-dimensional components in a first construction space arranged in the 3D printer and, simultaneously, one or more second three-dimensional components in a second construction space which is arranged adjacent to the first construction space at a horizontal distance therefrom in the 3D printer.

In other words, two or more construction jobs may be carried out simultaneously using the 3D printer according to the invention, namely in two or more adjacent construction spaces arranged at a horizontal distance from each other. In this respect, the 3D printer itself may for example be referred to as a common/shared 3D printer with respect to the first and the second construction space, as one or more of its components (for example print head and/or coating device feeding device and/or housing and/or plant frame) may be used collectively by/for both the first construction space (to perform the first construction job) and the second construction space (to perform the second construction job) or may be assigned to both construction spaces.

I.e., the 3D printer is configured to build up a first layer stack in the first construction space, which contains the at least one first component, and simultaneously to build up a second layer stack in the second construction space, which contains the at least one second component, the first and the second layer stack being arranged to be separate from each other in the 3D printer.

The horizontal distance between two adjacent construction spaces may, for example, be less than or equal to 1.5 m, for example less than or equal to 1.4 m, for example less than or equal to 1.3 m, for example less than or equal to 1.2 m, for example less than or equal to 1.1 m, for example less than or equal to 1.0 m, for example less than or equal to 0.9 m, for example less than or equal to 0.8 m, for example less than or equal to 0.7 m, for example less than or equal to 0.6 m, for example less than or equal to 0.5 m, for example less than or equal to 0.4 m, for example less than or equal to 0.3 m, for example less than or equal to 0.2 m.

The horizontal distance between two adjacent construction spaces may, for example, be used to (for example additionally) fix (for example on a linear guiding structure), for example to support (for example on a linear guiding structure), a coating device arrangement of the 3D printer (an example of this coating device arrangement will be described later in detail) in the space formed by the horizontal distance. For example, each of a first and a second coating device of the coating device arrangement (an example of these coating devices will be described later in detail) may be fixed (for example supported) between the two adjacent construction spaces (for example additionally), for example to a respectively separate linear guidance/slide or to a common linear guidance/slide. The linear guiding structure or the separate linear guidances/slides or the common linear guidance/slide may, in turn, be fixed to a portion of a common frame structure of the 3D printer.

For example, the 3D printer may comprise a common frame structure in which both the first construction space and the second construction space are arranged, and which extends with a portion thereof between two adjacent construction spaces, i.e. in the space formed by the horizontal distance. For example, components of the 3D printer may be fixed to this portion of the frame structure, for example the above-mentioned coating device arrangement or a linear guiding structure thereof.

The first construction space and/or the second construction space may, for example, be arranged at a respectively defined (by the 3D printer) and/or predetermined position in the 3D printer. For example, the (common) frame structure may contribute to specify the first and the second construction space. For example, the 3D printer may comprise one or more plant-fixed construction field limitations per construction space, extending in a horizontal direction, which surround the construction field of the respective construction space at least in part. For example, at least one plant-fixed construction field limitation extending in a horizontal direction may be provided per construction space, which extends along any one of the later described short and long sides.

According to various embodiments, the 3D printer may, for example, comprise a first construction platform and a second construction platform and may be configured to receive the first construction platform and the second construction platform simultaneously (for example at a distance from each other in a horizontal direction; alternatively, for example, in an adjoining way, wherein, for example, one or both of the construction platforms is/are greater than their associated construction space in a top view) in a respectively associated first and second construction platform construction position, respectively, separate from each other (i.e., different from each other), in which the respective construction platform is arranged within the 3D printer for building up the at least one component by means of the 3D printer, and in which the first construction space is formed/arranged above the first construction platform and the second construction space is formed/arranged above the second construction platform. The first construction platform and the second construction platform may delimit the respective construction space for example in a downward direction. In other words, the respective construction space may, for example, be at least co-defined by an associated construction platform.

In this regard, the respective construction platform may, for example, be provided to be stationary in the plant, i.e. to be optionally adjustable as to its height but otherwise stationary (in its construction platform construction position), or may be configured to be movable (for example by being received in a movable construction box or by being movably guided on a rail system). In the latter case, the respective construction platform may, for example, delimit the related construction space in a downward direction when in its related construction platform construction position.

A plate-shaped structure may, for example, be disposed on the construction platform (or in the lower area of the construction space) which is removed from the construction box after the component has been manufactured, together with the particulate material fill and the component, in order to unpack the component from the particulate material fill of unsolidified particulate material, whereas the construction platform may remain in the construction box.

The first and/or the second construction platform may, for example, be accommodated in an associated construction box. This has proven appropriate in practice; alternatively, a component or a layer stack including the component may, however, also be built on the construction platform, free in a peripheral direction.

A horizontal distance between the construction platforms—when these are in the respective construction platform construction position—may be identical with the above horizontal distance between the construction spaces.

According to various embodiments, the 3D printer may, for example, comprise a first construction box and a second construction box and may be configured to receive the first construction box and the second construction box simultaneously, for example at a distance from each other in a horizontal direction, in a respectively associated, separate first and second construction box construction position, respectively, in which the respective construction box is arranged within the 3D printer for building the at least one component by means of the 3D printer in the first and second construction space, respectively, defined by the respective construction box, so that respectively one or more components may be built up in layers simultaneously in the first construction box and the second construction box.

In other words, the respective construction space may, for example, be at least co-formed by an associated construction box, for example at least co-formed at least circumferentially. In this respect, the respective construction box may, for example, be provided to be stationary in the plant or may be configured to be movable. In the latter case, the respective construction box defines the associated construction space when in its related construction box construction position.

In other words, the 3D printer may be configured as a multi-box 3D printer according to this embodiment, which is able to receive several construction boxes at the same time, for example in a respective, defined/predetermined construction box receiving space.

It should be understood that the number of construction boxes which can be received simultaneously in the 3D printer may further be increased, for example to three, four, five, six or more construction boxes. The same applies to the above-described construction platforms and generally to the construction spaces.

The construction platforms and/or the construction boxes may, for example, be formed identical.

According to various embodiments, the first construction box and/or the second construction box may, for example, comprise a peripheral wall structure extending in a vertical direction, which delimits a respective construction box interior space.

For example, in the construction box interior space defined by the respective construction box, a first or second construction platform extending in a horizontal direction may be provided, wherein for example a first or second construction space is defined by the respective construction box interior space above the respective construction platform, which is open in an upward direction, in which at least one component may be built by means of the 3D printer, when the construction box is in its respectively associated construction box construction position.

According to various embodiments, the first construction platform and/or the second construction platform may, for example, be height-adjustable, so that the respective construction platform may be lowered gradually for building a component, for example by a respective layer thickness. The respective construction platform may, for example, be lowered by means of a respectively assigned plant-fixed lift drive or by means of its own lift drive, integrated in the respective construction box. I.e., according to various embodiments, the respective construction space may be expanded gradually by gradually lowering the related construction platform during the construction process, or may rather "grow" together with the component to be manufactured. Gradually lowering the construction platform has proven appropriate in practice; alternatively, a component or a layer stack including this component may, however, also be built by for example gradually lifting the printing device and the coating device arrangement.

The first and/or the second construction space (for example the first and/or the second construction platform or the first and/or the second construction box) have two long sides and two short sides in a top view. For example, the first and/or the second construction space (for example the first and/or the second construction platform or the first and/or the second construction box) may be configured to be rectangular in a top view. For example, the respective short side of the first and/or the second construction space (for example of the first and/or the second construction platform) may have a dimension of less than or equal to 2 m, for example less than or equal to 1.8 m, for example less than or equal to 1.6 m, for example less than or equal to 1.5 m, for example less than or equal to 1.4 m, for example less than or equal to 1.3 m. The dimension may, for example, be greater than or equal to 0.5 m, for example greater than or equal to 0.6 m, for example greater than or equal to 0.7 m, for example greater than or equal to 0.8 m, for example greater than or equal to 0.9 m, for example greater than or equal to 1.0 m. The exemplary values of the lower and upper thresholds may be combined in any way in this regard, for example as follows: 0.5 to 2 m, 0.6 to 1.6 m or 1 m to 1.3 m. If more than 2 construction spaces, for example at least 3, for example at least 4, for example at least 5, for example at least 6 construction spaces are provided, the data provided may apply to all construction spaces.

With the described configuration of the first and/or the second construction space, on the one hand the handling of the respective construction space can be facilitated, for example an ergonomic unpacking of the respective construction space or of the respective construction box can be allowed. In addition a fast manufacturing of the components can be provided by the described configuration, especially if the coating device arrangement travels in a direction perpendicular to the long side for applying a layer, so that it has to travel only a comparatively short distance. The speed of the coating device arrangement may be a limiting factor and may, for example, be less than the speed at which a print head is moved.

According to various embodiments, the first and the second construction space (for example the first and/or the second construction platform or the first and/or the second construction box) may, for example, be arranged adjacent to each other along a respective short side, for example substantially along the entire respective short side. For example, the first and the second construction space (for example the first and/or the second construction platform or the first and/or the second construction box) may be arranged with respect to each other in such a way that substantially the altogether four short sides are parallel to each other and respectively two long sides (one of each construction space) are in extension to each other.

As already suggested above, the first and/or the second construction platform or the first and/or the second construction box may for example, according to various embodiments, be movable between their respective construction position and an additional position in which the respective construction platform or construction box is arranged outside the 3D printer (and is, for example, easily accessible for a user). This allows, for example, to facilitate an unpacking process of the at least one component from the associated construction box.

The respective construction box may, for example, be movable via an associated roller conveyor into and out of its associated construction box construction position. The respective roller conveyor (or an alternative construction box feeding device) may, in turn, be connected with a common, driverless transport system, by means of which the first and the second construction box may be moved to the additional position.

In the case of a movable construction box, the 3D printer may, for example, be configured to align and/or fix the respective construction box in the associated construction box construction position by means of an alignment and/or fixing mechanism.

The additional position may, for example, be an unpacking position in which the construction box or rather the components contained therein are unpacked (manually or in an automated way) and/or a construction box stock position in which one or more construction boxes are kept in stock.

The 3D printer comprises a coating device arrangement which is displaceable across the first and the second construction space in a first horizontal direction (i.e. for example across the first and the second construction box if these are in a respectively associated construction position), to supply the first and the second construction space with construction material in the form of a respectively uniform construction material layer of the construction material to be solidified. The coating device arrangement may, for example, be configured to supply the first and the second construction space in parallel with construction material. The coating device arrangement may, for example, be configured as a bidirectional coating device arrangement, i.e. as a coating device arrangement which may apply a uniform construction material layer both on a journey and on a return journey.

The first horizontal direction is perpendicular to the long sides and/or parallel to the short sides. Hereby, a quick manufacturing of the component can be achieved.

According to various embodiments, the coating device arrangement may, for example, comprise a first coating device which is assigned to the first construction space, and a second coating device which is separate therefrom, which is assigned to the second construction space. In this respect, the first and the second coating device may be movable over their associated construction space in a respective first horizontal direction, for example in first horizontal directions parallel to each other, for example together or separately.

In this respect, the segmentation into a first and a second coating device allows a quick forming of uniform layers for the construction spaces of an appropriate quality, for example at justifiable costs and/or having a justifiable complexity.

According to various embodiments, the first and/or the second coating device may, for example, respectively comprise a container (for example an elongated container) which defines an inner cavity for receiving particulate construction material, which leads to an opening (for example a longitudinal slot) for outputting the particulate construction material onto the construction field of the respective construction space. The first and/or the second coating device may thus, for example, be configured as "container coating devices", for example as "slot coating devices". The elongated first coating device/container and the elongated second coating device/container may be arranged parallel to each other, for example in extension to each other or in a longitudinal direction one after another.

For example, a closing device may respectively be disposed on the first coating device and/or the second coating device (for example comprising one or more inflatable hollow bodies which in their inflated state close the opening, or a sliding mechanism), which is configured to selectively close the opening for outputting the particulate construction material, for example in a controlled way, i.e. by means of an electronic control unit.

For example, a stroking member may respectively be attached to the first coating device and/or the second coating device, which is configured to stroke particulate construction material output from the opening, to thereby level and/or compress the output particulate material.

For example, the first coating device and the second coating device may be connected to each other in a fixed way, so that they are movable across the first construction space or the second construction space together.

The 3D printer comprises a common printing device which is displaceable across the first and the second construction space in a second horizontal direction, to selectively solidify a subarea of a previously applied construction material layer of the respective construction space by a controlled output of a flowable treatment agent. The printing device may, for example, be configured to sequentially supply the first construction space and the second construction space with treatment agent. In this respect, the printing device may, for example, first process the first construction space entirely (for example travel across the same completely), to subsequently process the second construction space entirely. Alternatively, the printing device may, for example, first process a part of the first construction space, then process a part of the second construction space, then process another part of the second construction space, and then process another part of the first construction space (bidirectional processing). Further alternatively, the printing device may, for example, first process a part of the first construction space, then process a part of the second construction space, then process another part of the first construction space, and then process another part of the second construction space (unidirectional processing).

The treatment agent contributes to selectively solidifying the subarea and may, for example, be a binding agent, for example a binder component of a multi-component binder.

In other words, the first and the second construction area are served by a common or rather the same printing device, for example by a common or rather the same print head.

The common printing device may, for example, comprise a linear guiding structure (for example a continuous linear guiding structure), the length of which is substantially greater than or equal to the sum of the first construction space length and the second construction space length and/or which substantially extends entirely along the first and the second construction space (for example over the same or laterally next to the same), for example in a longitudinal direction of the respective construction space. Therefore, a common print head (see below) is able to serve both the first construction space and the second construction space. The linear guiding structure may, for example, be fixed to a carrier structure (for example a continuous carrier structure) which extends above or laterally next to the first and the second construction space, for example in a longitudinal direction of the respective construction space. The carrier structure may, for example, be fixed to the common frame structure of the 3D printer.

The second horizontal direction is perpendicular to the first horizontal direction in which the coating device arrangement is movable, and/or is perpendicular to the short sides of the construction spaces and/or is parallel to the long sides.

The printing device (for example the print head thereof) may, for example, be movable/displaceable besides the second horizontal direction additionally in the first horizontal direction, so that the printing device (for example the print head thereof) is movable in an altogether meandering pattern, for example in a U-shape, across the two construction spaces. It is, however, also possible that the printing device (for example the print head thereof) extends for example across the entire construction space width or covers the same.

According to various embodiments, the common printing device may, for example, comprise a common print head having one or more printing nozzles.

The common print head may, for example, be configured to serve both the first construction space and the second construction space. I.e., the first construction space and the second construction space are selectively printed on using the same print head, for example using the same printing nozzles.

The common print head may, for example, span a portion, for example substantially the half, or the entire length/dimension of a respective short side of the construction spaces with its printing nozzles. I.e., the print head may have a treatment agent output region formed by the printing nozzles, the dimension (for example length) of which corresponds to a portion, for example substantially the half, or the entire length/dimension of a respective short side.

The common print head may, for example, be arranged in a vertical direction at a distance from the coating device arrangement, for example the first coating device and the second coating device, and may be movable horizontally in a separate horizontal plane.

According to various embodiments, the 3D printer may, for example, comprise a common coating device feeding unit integrated in the 3D printer, which is arranged in a vertical direction above the first and the second coating device, and/or by which both the first and the second coating device can be supplied with construction material (for example a respective supply container of the coating device, which is disposed over the above container of the respective coating device), and/or comprising a common mixing unit, for example comprising a common mixing container having an agitator, wherein construction material prepared in the mixing container can be fed to the first and the second coating device by a branching feeding structure, if they are moved into a respective filling position.

According to various embodiments, the 3D printer may, for example, comprise a common frame structure in which both the first construction space and the second construction space are arranged, and/or a common housing in which both the first construction space and the second construction space are arranged. The housing may, for example, comprise a continuous housing portion or wall portion covering both the first and the second construction space, for example respectively predominantly, for example respectively entirely. The common frame structure may, for example, be formed continuous or rather connected. The common frame structure and/or the common housing may, for example, serve at least in sections both the first construction space and the second construction space or may be used by these or may be assigned to these.

For example, the 3D printer may comprise a common control cabinet.

According to various embodiments, the 3D printer may, for example, comprise a first and a second construction box insertion opening which are for example provided on a common side (for example peripheral side) of the 3D printer and/or formed in a common side wall of the 3D printer. The 3D printer or its housing may, for example, comprise a front and a rear side wall as well as two lateral side walls which are configured to be longer than the front and the rear side wall, wherein the first and the second construction box insertion opening are provided in one of the two lateral side walls.

According to various embodiments, a 3D printer arrangement may, for example, comprise:
a (first) 3D printer configured as described above, and
a driverless transport system for automatically feeding the 3D printer with construction boxes.

The driverless transport system may, for example, comprise a rail system extending outside the 3D printer on the side of the first and the second construction box insertion opening, and along which a respective one of the first and second construction box is displaceable. The driverless transport system may, for example, comprise a transport trolley which is movable along the rail system and which is able to transport at least one construction box.

The driverless transport system, for example the rail system, may for example connect the 3D printer or the 3D printers with an optional construction box stock, in which one or more construction boxes are held available, and/or an optional microwave oven, for example for further solidifying or completely hardening the components, and/or an optional unpacking station, where a component may be unpacked from the particulate material fill of unsolidified construction material containing the component (for example in an automated way) and may optionally be stocked in a component stock.

According to various embodiments, the 3D printer arrangement may, for example, comprise a first and a second 3D printer, wherein the first and the second 3D printer are arranged on opposite sides in such a way that the first and the second construction box insertion opening of the first 3D printer and the first and the second construction box insertion opening of the second 3D printer face each other and the driverless transport system, for example the rail system thereof, extends between the first and the second 3D printer and/or is movable between these, so that the first and the second 3D printer can be charged with respective construction boxes by the common driverless transport system, for example the rail system thereof.

According to various embodiments, a generative manufacturing process may be provided, where one or more three-dimensional components, for example a casting mold or a foundry core are respectively built up in layers in a respective construction job simultaneously in a first construction space and a second, adjacent construction space of a common 3D printer configures as described above, for example by forming layers of particulate construction material, for example containing sand particles, lying one upon the other and selectively solidifying a partial region of the respective construction material layer in the respective construction space. As described above for the 3D printer, the two construction spaces may, for example, be arranged at a horizontal distance from each other.

Using the described method, a first construction job in a first construction space and a second construction job in a second construction space may be executed simultaneously, i.e. overlapping in time, using a common or rather the same 3D printer. The first construction job and the second construction job may, for example, take the same period of time or may take different times, in which case the second construction job is executed alone upon completion of a first one of the two construction jobs. The above-described coating device of the finished construction job can then be "switched off", and the above-described common printing device can then focus on the second construction job alone. The construction box assigned to the first construction job may then also be already removed for an unpacking process. The first and the second construction job may, for example, be started together or may alternatively be started one after the other, i.e. a second construction job may be "switched to" a first construction job that has already started.

According to various embodiments, the following may apply in the generative manufacturing process:
the first construction space may be arranged above a first construction platform and the second construction space may be arranged above a second construction platform, and/or
the first construction space may be defined by a first construction box and the second construction space may be defined by a second construction box, and/or
the first and the second construction space may respectively have two long and two short sides in a top view, wherein the first and the second construction space are, for example, arranged with two short sides adjacent to each other,
each construction space may be served by a separate coating device, for which purpose the respective coating device travels across its associated construction space for example perpendicularly to the long sides thereof, and/or
both construction spaces may be served by a common printing head, for which purpose the common printing head travels across the first and the second construction space for example perpendicularly to the short sides thereof, for example in a meandering pattern, for example in a U-shape, and/or
the common printing head may be displaced in a first horizontal plane and both coating devices may be displaced in a second horizontal plane which is arranged at a vertical distance from the first horizontal plane and is located, for example, underneath the same, and/or
the printing head may be displaced at a higher speed than the respective coating device (for example, the printer may be displaced by the factor 3 or more faster than the coating device; for example, the printer may be displaced at approximately 1 m/s, whereas the coating device is displaced at approximately 0.2 m/s), and/or
the first construction space and the second construction space may be accommodated in a common housing, and/or
the first construction space and the second construction space may be are arranged in a common frame structure, and/or
the first coating device and the second coating device may be charged with construction material by a common coating device feeding unit.

Additional features and advantages of the present invention are illustrated by or are explained in detail in the enclosed drawings which are incorporated herein, as well as the following detailed description, which together serve to explain certain principles of the present invention.

The invention will hereinafter be described in more detail by means of various embodiments and with reference to the Figures.

FIGS. 15 and 16 show a 3D printer arrangement according to an embodiment of the invention;

In the following detailed description, reference is made to the enclosed Figures which are incorporated therein and in which specific embodiments are shown by way of illustration, according to which the invention can be performed. In this respect, the terms "up", "down", "front", "rear", etc. are used with reference to the orientation in the described Figures. As components of embodiments may be positioned in a number of different orientations, the terminology indicating the different directions serves for illustration and shall not be restrictive in any way. It shall be understood that other embodiments may be used and structural or logical changes may be made without deviating from the scope of protection of the present invention. It goes without saying that the features of the various exemplary embodiments described herein may be combined unless specified otherwise. Thus, the following detailed description should not be understood in a restrictive sense and the scope of protection of the invention shall be defined by the attached claims.

In this description, terms such as "connected", "attached" or "coupled" may be used to describe both a direct and indirect connection, a direct or indirect attachment and a direct or indirect coupling.

In the Figures, identical or similar members are provided with identical reference numbers where appropriate.

Figure 1:
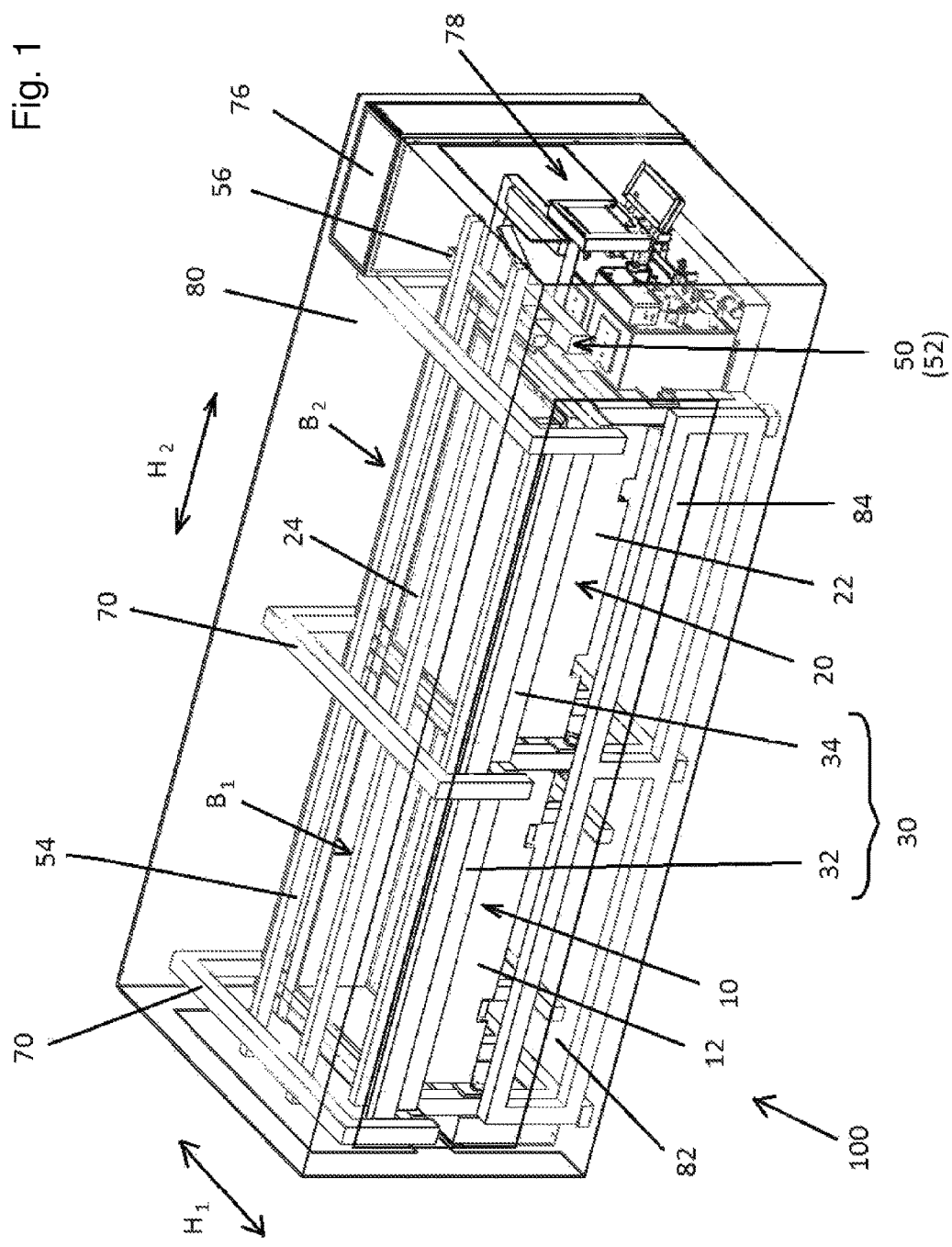
FIG. 1 shows a schematic perspective view of a 3D printer according to a first embodiment of the invention.

FIG. 1 shows a schematic perspective view of a 3D printer 100 according to a first embodiment of the invention.

The 3D printer 100 shown is configured to build up a three-dimensional component, for example a casting mold or a foundry core in layers by forming layers of particulate construction material, for example containing sand particles, lying one upon another and selectively solidifying a subarea of the respective construction material layer. For this purpose, the 3D printer may, for example, apply/execute a selective treatment agent printing method.

The 3D printer 100 is configured to build one or more first three-dimensional components in a first construction space B1 arranged in the 3D printer and, simultaneously, one or more second three-dimensional components in a second construction space B2 arranged adjacent to the first construction space at a horizontal distance therefrom in the 3D printer.

As shown in FIG. 1, the 3D printer 100 may, for example, comprise a first construction box 10 and a second construction box 20, which by way of example are formed as mobile construction boxes, which can be removed from the 3D printer 100 following the respective construction job to unpack the components.

As shown, the 3D printer 100 may, for example, be configured to receive the first construction box 10 and the second construction box 20 simultaneously in a respectively associated first and second construction box construction position, respectively, separate from each other. In its construction box construction position, the respective construction box defines the first and the second construction space, respectively.

Consequently, using the 3D printer 100, a first layer stack may be built in the first construction box 10 and, simultaneously, a second layer stack may be built in the second construction box 20, each layer stack containing one or more components which are embedded into an unsolidified particulate material (at least in sections).

As shown, the first construction box 10 and/or the second construction box 20 may, for example, comprise a peripheral wall structure, 12 and 22, respectively, extending in a vertical direction, which delimits a respective construction box interior space. Here, by way of example, the respective vertical peripheral wall structure has a rectangular shape when viewed from above, with two long and two short sides.

As shown, a first or second construction platform may, for example, be received in the respective construction box interior space, extending in a horizontal direction. In this respect, the construction platform 24 of the second construction box 20 is shown in FIG. 1, whereas the construction platform of the first construction box 10 is moved downward.

In this respect, a first and a second construction space B1 and B2, respectively, is defined by the respective construction box interior space over the respective construction platform, which is open in an upward direction, and in which at least one component can be built up by means of the 3D printer, when the construction box is in its respectively associated construction box construction position.

The first construction platform and/or the second construction platform 24 may, for example, be height-adjustable, so that the respective construction platform may be lowered layerwise for building a component. Thus, the construction space B1 and B2, respectively, can be gradually increased in the course of the respective construction job.

As shown in FIG. 1, the first construction space B1 and/or the second construction space B2 may, for example, have two long sides and two short sides in a top view. The respective short side may, for example, have a dimension of less than or equal to 1.8 m, which allows an ergonomic unpacking of the components by running/walking along the two long sides of the respective construction box 10 and 12, respectively.

As further shown in FIG. 1, the first construction space B1 and the second construction space B2 may, for example, be adjacent to each other along a respective short side, for example substantially along the entire respective short side. In other words, the two construction spaces B1 and B2 may be opposite to each other with two short sides, whereas respectively two long sides are in extension to each other.

As shown in FIG. 1, the 3D printer 100 may, for example, comprise a coating device arrangement 30 which is movable across the first construction space B1 and the second construction space B2 in a first horizontal direction H1, to supply the first and the second construction space with construction material in the form of a respectively uniform construction material layer of the construction material to be solidified.

As shown, the first horizontal direction H1 may, for example, be perpendicular to the long sides and/or parallel to the short sides in this regard.

The coating device arrangement 30 may, for example, comprise a first coating device 32 assigned to the first construction space B1, and a second coating device 34 separate therefrom, which is assigned to the second construction space B2.

The first coating device 32 and the second coating device 34 may, for example, be firmly connected, so that they can be moved together across the first construction space and the second construction space, respectively.

An example of such a coating device arrangement 30 is described below with reference to FIG. 17, and an example of a coating device 32, 34 is described below with reference to FIG. 18.

As shown in FIG. 1, the 3D printer 100 may, for example, comprise a common printing device 50 which is movable across the first construction space B1 and the second construction space B2 in a second horizontal direction H2, to selectively solidify a subarea of a previously applied construction material layer of the respective construction space by a controlled output of a flowable treatment agent, for example a binding agent.

As shown, the second horizontal direction may, for example, be perpendicular to the first horizontal direction H1 and/or perpendicular to the short construction space sides.

The common printing device 50 may, for example comprise a common print head 52 comprising one or more printing nozzles. The print head 52 may supply both the first construction space B1 and the second construction space B2 with the treatment agent. In other words, the first construction space B1 and the second construction space B2 share the print head 52 and its one or more printing nozzles, respectively.

As shown, the printing device 50 may, for example, comprise a guiding structure 54 extending in a longitudinal direction of the respective construction space substantially entirely along the two construction spaces B1 and B2 (here, for example, vertically above the construction spaces), and along which the print head 52 is displaceable in the second horizontal direction H2.

The print head 52 may have a treatment agent output region formed by the printing nozzles, the elongated extension of which corresponds, for example, to a portion, for example, as shown, substantially the half, of the length/dimension of a respective short construction space side. As shown, the printing device 50 may, for example, comprise a second guiding structure 56 in this regard, which is movable along the first guiding structure 54 together with the print head, and along which the print head 52 is movable in the first horizontal direction H1, so that the print head 52 is movable altogether in a meandering pattern, for example in a U shape, over/across the two construction spaces B1 and B2.

In a vertical direction, the print head 52 may, for example, be arranged at a distance from the first coating device 32 and the second coating device 34, and may consequently be displaceable horizontally in a separate horizontal plane, for example above the coating devices.

As further illustrated by FIG. 1, the 3D printer 100 may, for example, comprise a common frame structure 70 in which both the first construction space B1, here exemplarily formed by the first construction box 10, and the second construction space B2, here exemplarily formed by the second construction box 20, are arranged.

As further shown by FIG. 1, the 3D printer 100 may, for example, comprise a common housing 80, in which both the first construction space B1, here exemplarily formed by the first construction box 10, and the second construction space B2, here exemplarily formed by the second construction box 20, are accommodated. As shown, the common housing may, for example, comprise a continuous housing portion or wall portion which covers both the first construction space and the second construction space at least in part.

As further shown by FIG. 1, the 3D printer 100 may, for example, comprise a first construction box insertion opening 82 and a second construction box insertion opening 84 which may, for example, be provided on a common side of the 3D printer 100, and by means of which the first construction box 10 and the second construction box 20, respectively, can be introduced into their respective construction box construction position within the 3D printer.

As further shown by FIG. 1, the 3D printer 100 may, for example, comprise a common control cabinet 76 and a common operating station 78, for example including a common control panel.

Figure 2:
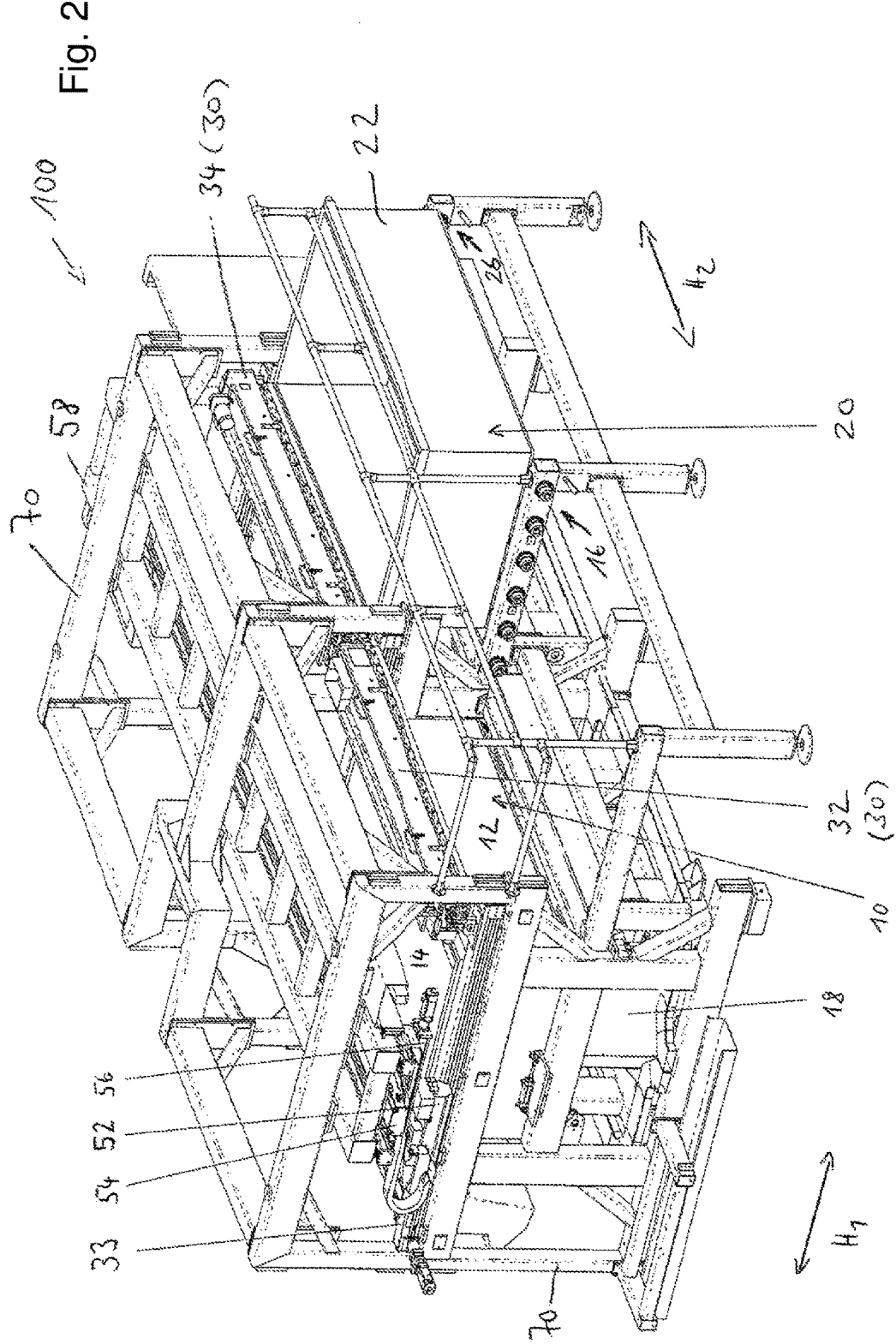
FIG. 2 shows a schematic perspective view of a 3D printer according to a second embodiment of the invention, some components of the 3D printer having been omitted, such as the housing and the coating device feeding unit.
Figure 3:
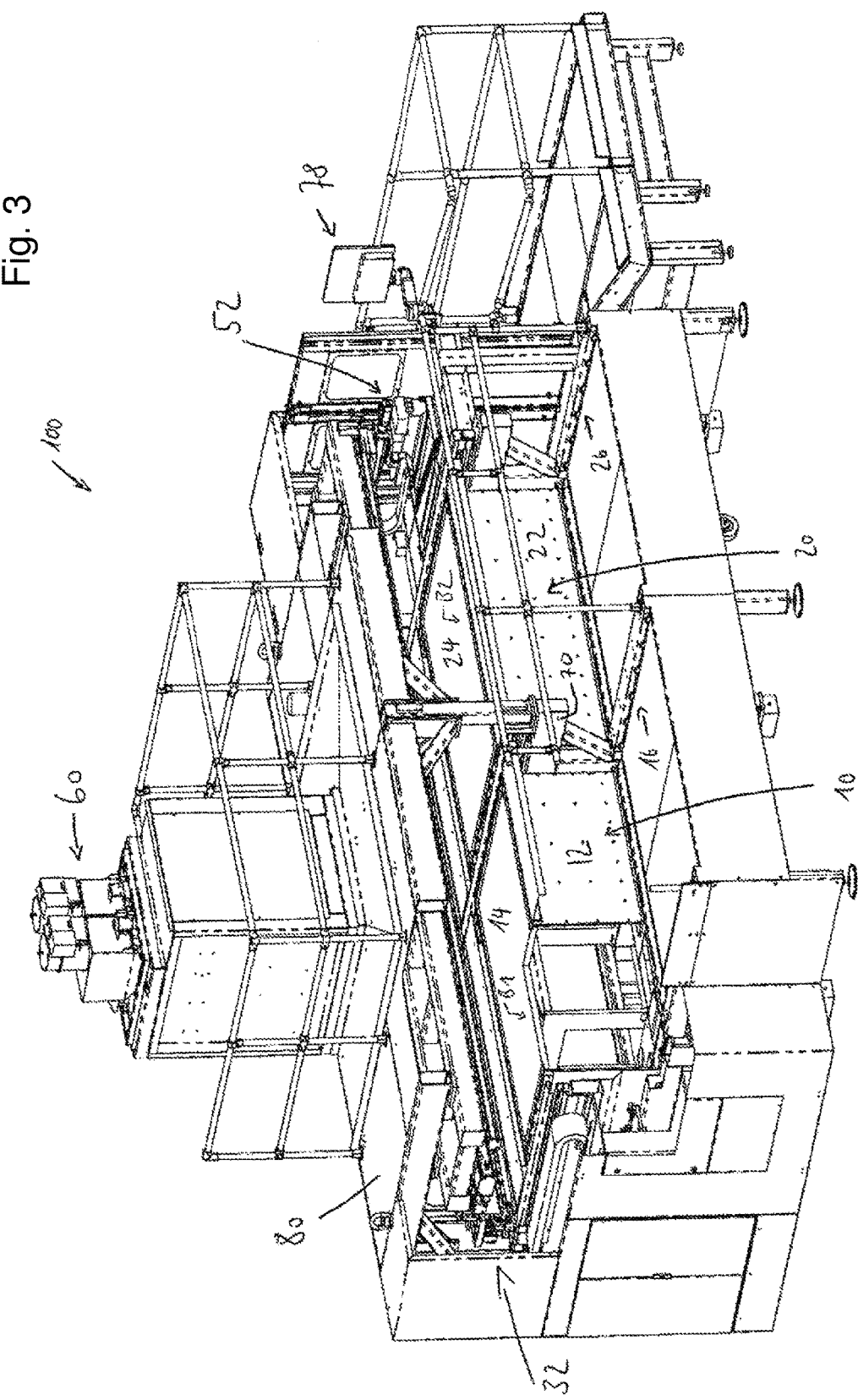
FIG. 3 shows a schematic perspective view of the 3D printer of FIG. 2, now a major part of the housing being shown as well, and, in addition, a part of the coating device feeding unit being illustrated.

FIGS. 2 and 3 respectively show a schematic perspective view of a 3D printer according to a second embodiment of the invention, some components of the 3D printer having been omitted in FIG. 2, such as the housing and the coating device feeding unit. In addition, a part of the 3D printer is cut free on the front left-hand side in FIG. 3, in order to make visible for example the first construction platform.

A description of features similar or identical to those of the 3D printer of the first embodiment is hereinafter partially omitted.

The 3D printer 100 according to the second embodiment is configured to build up a three-dimensional component in layers by forming layers of particulate construction material lying one upon the other and by selectively solidifying a partial area of the respective construction material layer, for example by means of a selective treatment agent printing method.

The 3D printer 100 is further configured to build up one or more first three-dimensional components in a first construction space B1 arranged in the 3D printer, and simultaneously one or more second three-dimensional components in a second construction space B2 arranged adjacent to the first construction space at a horizontal distance thereto in the 3D printer.

As in the first embodiment, also the 3D printer 100 according to the second embodiment may, for example, comprise a first construction box 10 and a second construction box 20, which are for example again configured as mobile construction boxes, which may be removed from the 3D printer 100 upon completion of the respective construction job to unpack the components. In this respect, the 3D printer 100 is configured to receive the first construction box 10 and the second construction box 20 simultaneously in a respectively associated first and second construction box construction position, respectively, separate from each other.

Figure 4:
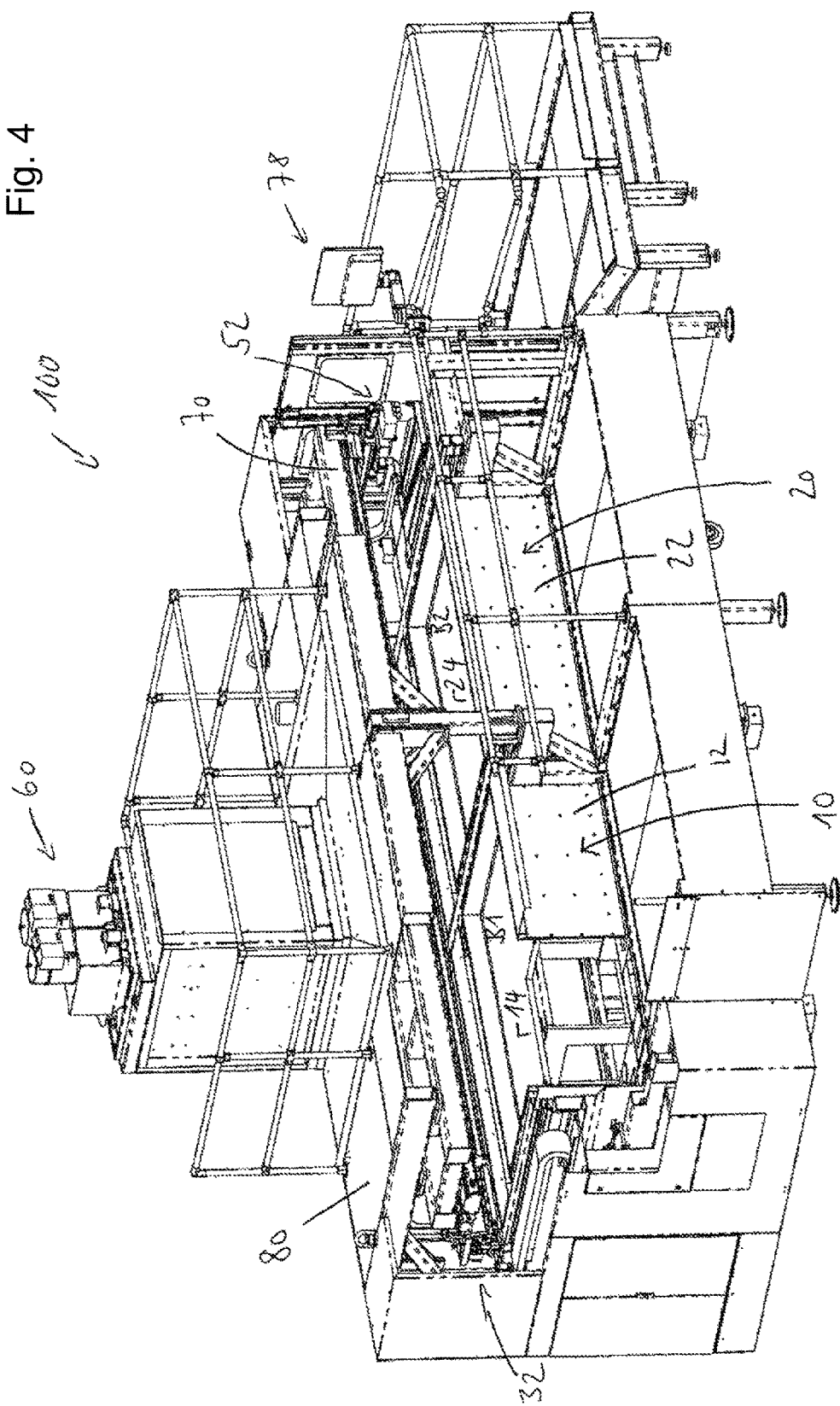
FIGS. 4 to 14 show schematic perspective views of the 3D printer of FIGS. 2 and 3, by which manufacturing of a component using the 3D printer is to be illustrated.

As shown in FIG. 2, the first construction box 10 and/or the second construction box 20 may, for example, comprise a peripheral wall structure 12 and 22, respectively, extending in a vertical direction, delimiting a respective construction box interior space. Here, the respective vertical circumferential wall structure has, for example, a rectangular shape when viewed from above. As shown in FIG. 3, a first construction platform 14 and a second construction platform 24, respectively, extending in a horizontal direction, may, for example, be received in the respective construction box interior space. The first construction platform 12 and/or the second construction platform 24 may, for example, be height-adjustable, so that the respective construction platform may, for example, be lowered layerwise for building a component. In this connection, reference number 18 designates a stationary, plant-fixed lift drive for the first construction box 10. However, a lift drive integrated in the construction box may be used as well. In this respect, a first and a second construction space B1 and B2, respectively, is defined by the respective construction box interior space above the respective construction platform, which is open in an upward direction, in which at least one component may be built up by means of the 3D printer, when the construction box is in its associated construction box construction position. Cf. FIG. 4.

As shown, the first construction space B1 and/or the second construction space B2 may, for example, have two long sides and two short sides, when viewed from above. As in the first embodiment, the respective short side may, for example, have a dimension of less than or equal to 1.8 m. As in the first embodiment, the two construction spaces may be arranged adjacent to each other along two short sides.

In addition, a respective optional construction box feeding device 16 and 26 is shown in FIGS. 2 and 3, by means of which the first construction box 10 and the second construction box 20, respectively, is movable into its construction box construction position within the 3D printer. As shown, the respective construction box feeding device may, for example, be configured as a roller conveyor.

As shown in FIGS. 2 and 3, the 3D printer 100 may, for example, comprise a coating device arrangement 30 which is movable across the first construction space B1 and the second construction space B2 in a first horizontal direction H1, to supply the first and the second construction space with construction material in the form of a respectively uniform construction material layer of the construction material to be solidified, for example parallel to each other. As shown, the first horizontal direction H1 may, for example, be perpendicular to the long sides and/or parallel to the short sides in this respect, and the coating device arrangement 30 may for example, comprise a first coating device 32 assigned to the first construction space B1 and a separate second coating device 34 assigned to the second construction space B2. An example of such a coating device arrangement 30 is described below with reference to FIG. 17, and an example of a coating device 32, 34 is described below with reference to FIG. 18.

As shown in FIG. 2, the 3D printer may, for example, comprise a linear guiding structure 33, at which a longitudinal end (here the left one) of the first coating device 32 is guided to be linearly displaceable. Another linear guiding structure may, for example, be provided at the longitudinal end (here the right one) of the second coating device 34. Yet another linear guiding structure may, for example, be provided between the two coating devices 32, 34. The respective linear guiding structure may, for example, be supported on/by the common frame structure 70.

As shown in FIGS. 2 and 3, the 3D printer 100 may, for example, comprise a common printing device 50 which is movable across the first construction space B1 and the second construction space B2 in a second horizontal direction H2 (for example one after the other), to selectively solidify a partial area of a previously applied construction material layer of the respective construction space by a controlled output of a flowable treatment agent. As shown, the second horizontal direction may, for example, be perpendicular to the first horizontal direction H1. Even if an orientation of a first and a second horizontal direction perpendicular to each other has proved its worth in practice, it is generally possible to, for example, both coat and print in the same horizontal direction, for example respectively in a longitudinal direction of the two construction spaces, i.e. along the direction H$_2$.

The common printing device 50 may, for example, comprise a common print head 52 comprising one or more printing nozzles, and/or a guiding structure 54 (for example a linear guiding structure), along which the print head 52 may be moved. The guiding structure 54 may, for example, extend in a longitudinal direction of the respective construction space substantially entirely along both construction spaces B1 and B2, so that the print head is displaceable in the second horizontal direction H2.

As shown in FIG. 2, the 3D printer 100 may, for example, comprise a carrier structure 58 (for example an elongate, continuous carrier structure) to which the first guiding structure 54 is fixed and which itself is fixed to the frame structure 70 of the 3D printer.

The print head 52 may have a treatment agent output region formed by the printing nozzles, the elongate extension of which corresponds, for example, to a portion, for example as shown substantially the half, of the length/dimension of a respective short construction space side. As shown, the printing device 50 may, for example, comprise a second guiding structure 56 in this regard, which is movable along the first guiding structure 54 together with the print head and along which the print head 52 is movable in the first horizontal direction H1, so that the print head 52 is movable altogether in a meandering pattern, for example in a U shape across the two construction spaces B1 and B2.

As shown in FIG. 3, the 3D printer 100 may for example, comprise an integrated, common coating device feeding unit 60. As shown, the coating device feeding unit 60 is, for example, arranged in a vertical direction above the first and the second coating device 32, 34. Both the first and the second coating device 32, 34 can be supplied with construction material using the coating device feeding unit 60. For example, the coating device feeding unit 60 may comprise a common mixing unit (not shown), for example comprising a common mixing container having an agitator, wherein construction material prepared in the mixing container can be fed to the first and the second coating device 32, 34 by a branched feeding structure, if they are moved into a respective filling position. For this purpose, the respective coating device may, for example, comprise a construction material feed hopper which, for example, is funnel-shaped in cross-section. For the first coating device 32, FIG. 2 shows such a construction material feed hopper on the right-hand side of the coating device, the coating device being otherwise closed in an upward direction. The second coating device 34 may, for example, be provided with an analogous construction material feed hopper, for example at its longitudinal end facing the first coating device 32. The visible part of the coating device feeding unit 60 shown in FIG. 3 comprises a first and a second storing container, from which the mixing container may be supplied with a respective construction material component (for example a particulate material). Moreover, one or more liquid supply lines may lead to the mixing container.

FIGS. 4 to 14 show schematic perspective views of the 3D printer 100 of FIGS. 2 and 3, by means of which the manufacturing process of a component using the 3D printer 100 will hereinafter be described according to an exemplary embodiment of the invention. In order to allow a better illustration of the process, a part of the 3D printer was cut free in the Figures (according to the selected view on the front left).

In this respect, the 3D printer 100 performs a generative manufacturing process, where one or more three-dimensional components, for example a casting mold or a foundry core, are respectively built up in layers in a respective construction job simultaneously in a first construction space B1 and a second construction space B2 of a common 3D printer 100, arranged adjacent to the first construction space and with a horizontal distance, by forming layers of particulate construction material, for example containing sand particles, lying one upon the other and selectively solidifying a partial region of the respective construction material layer in the respective construction space.

As shown in FIG. 4, the following may apply in the generative manufacturing process:

the first construction space B1 may be arranged above a first construction platform 14 and the second construction space B2 may be arranged above a second construction platform 24, and/or the first construction space B1 may be defined by a first construction box 10 and the second construction space B2 may be defined by a second construction box 20, and/or the first and the second construction space B1, B2 may respectively have two long and two short sides in a top view, each construction space may be served by a separate coating device 32, 34 (see also FIG. 5), for which purpose the respective coating device travels across its associated construction space for example perpendicularly to the long sides thereof, and/or both construction spaces may be served by a common printing head 52, for which purpose the common printing head travels across the first and the second construction space for example perpendicularly to the short sides thereof, for example in a meandering pattern, for example in a U-shape (this is described in detail below), and/or the first construction space B1 and the second construction space B2 may be accommodated in a common housing 80, and/or the first construction space B1 and the second construction space B2 may be are arranged in a common frame structure 70, and/or the first coating device 32 and the second coating device 34 may be charged with construction material by a common coating device feeding unit 60.

The common print head 52 may, for example, be displaced in a first horizontal plane, whereas the two coating devices 32, 34 are displaced in a second horizontal plane which is arranged at a vertical distance from the first horizontal plane and is, for example, located underneath the same.

For example, the print head 52 may be displaced at a greater speed than the respective coating device 32, 34.

As shown in FIG. 4, in the generative manufacturing process, the two construction platforms 14 and 24 may be lowered by one layer thickness from the position shown in FIG. 3, when the two construction boxes 10, 20 are in their related construction position. The print head 52 is arranged on the right front side in FIG. 4, and the coating device arrangement 30 is arranged at the rear.

Figure 5:
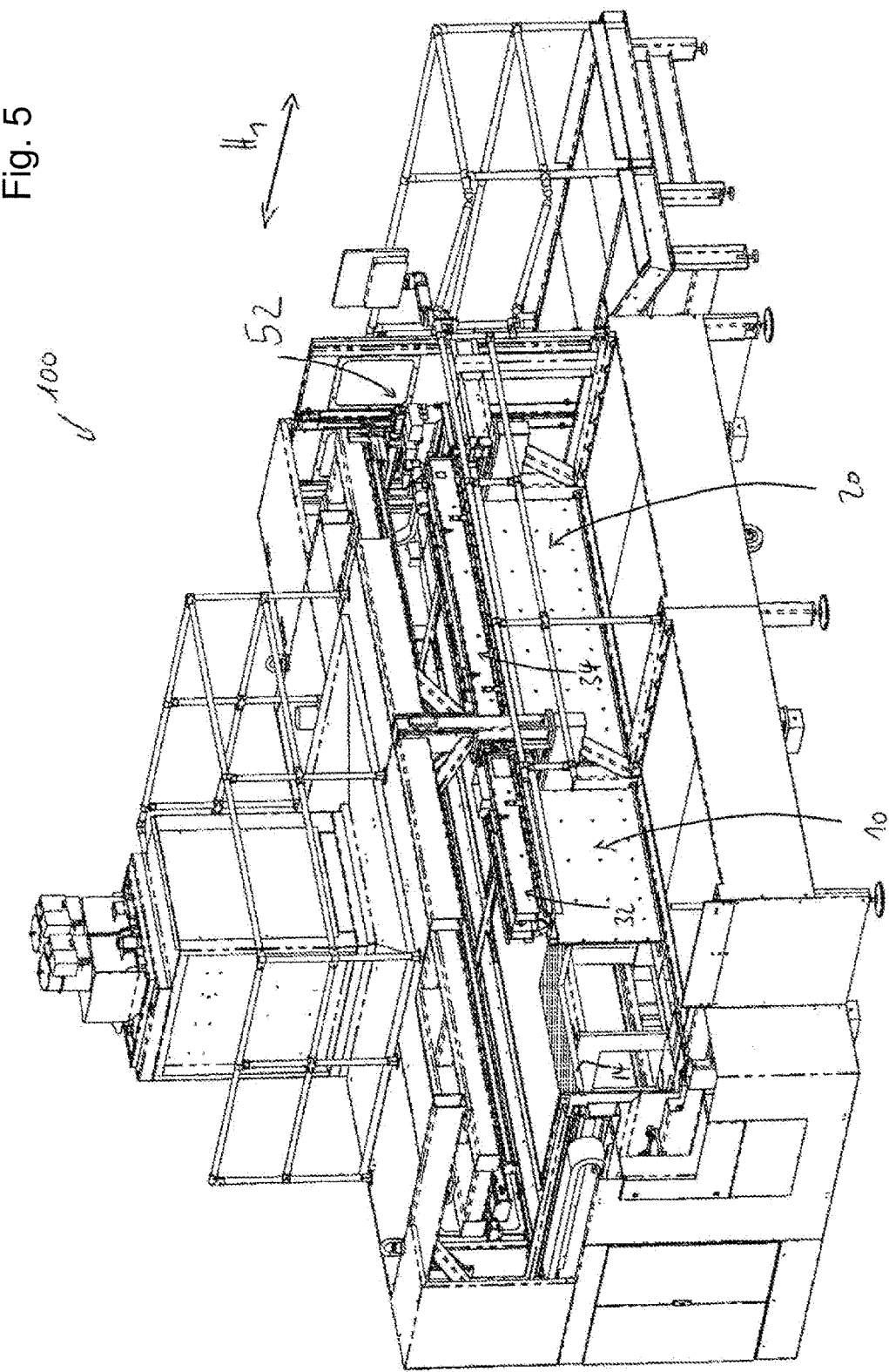

As shown in FIG. 5, the coating device arrangement 30 may then be displaced forward in the horizontal direction $H_1$, to put down a first construction material layer on the first construction platform 14 using the first coating device 32, and to put down a second construction material layer on the second construction platform 24 using the second coating device 34. In this respect, the thickness of the layer is represented to be increased in size relative to the other components. The print head 52 is still located at the front right.

Figure 6:
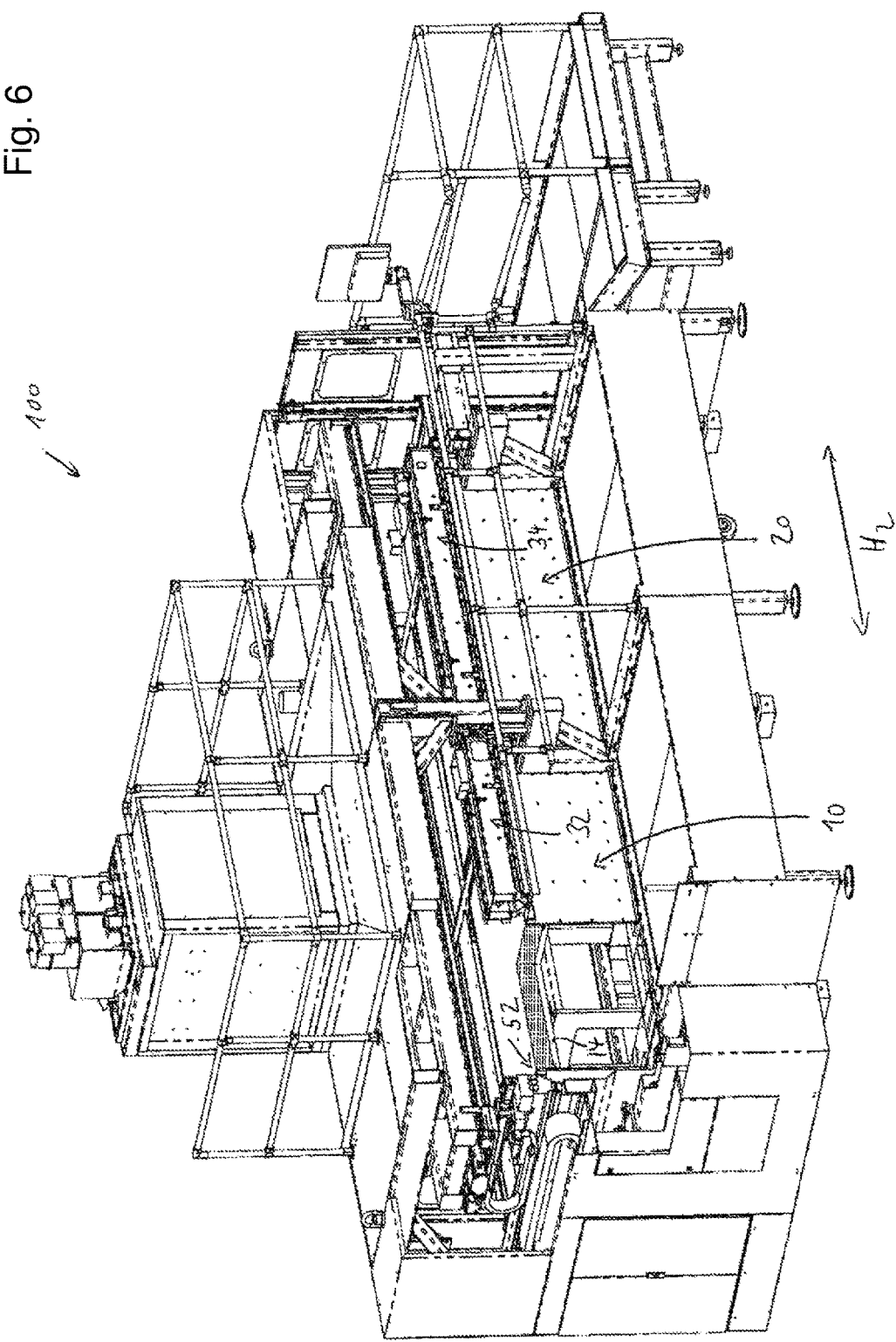

As shown in FIG. 6, the print head 52 may then be moved in the horizontal direction $H_2$ to the left front side, to selectively supply or rather print a front partial area (here, for example, the front half) of the second construction material layer and a front partial area (here, for example, the front half) of the first construction material layer with treatment agent one after the other. The coating device arrangement 30 remains in its position shown in FIG. 5.

Figure 7:
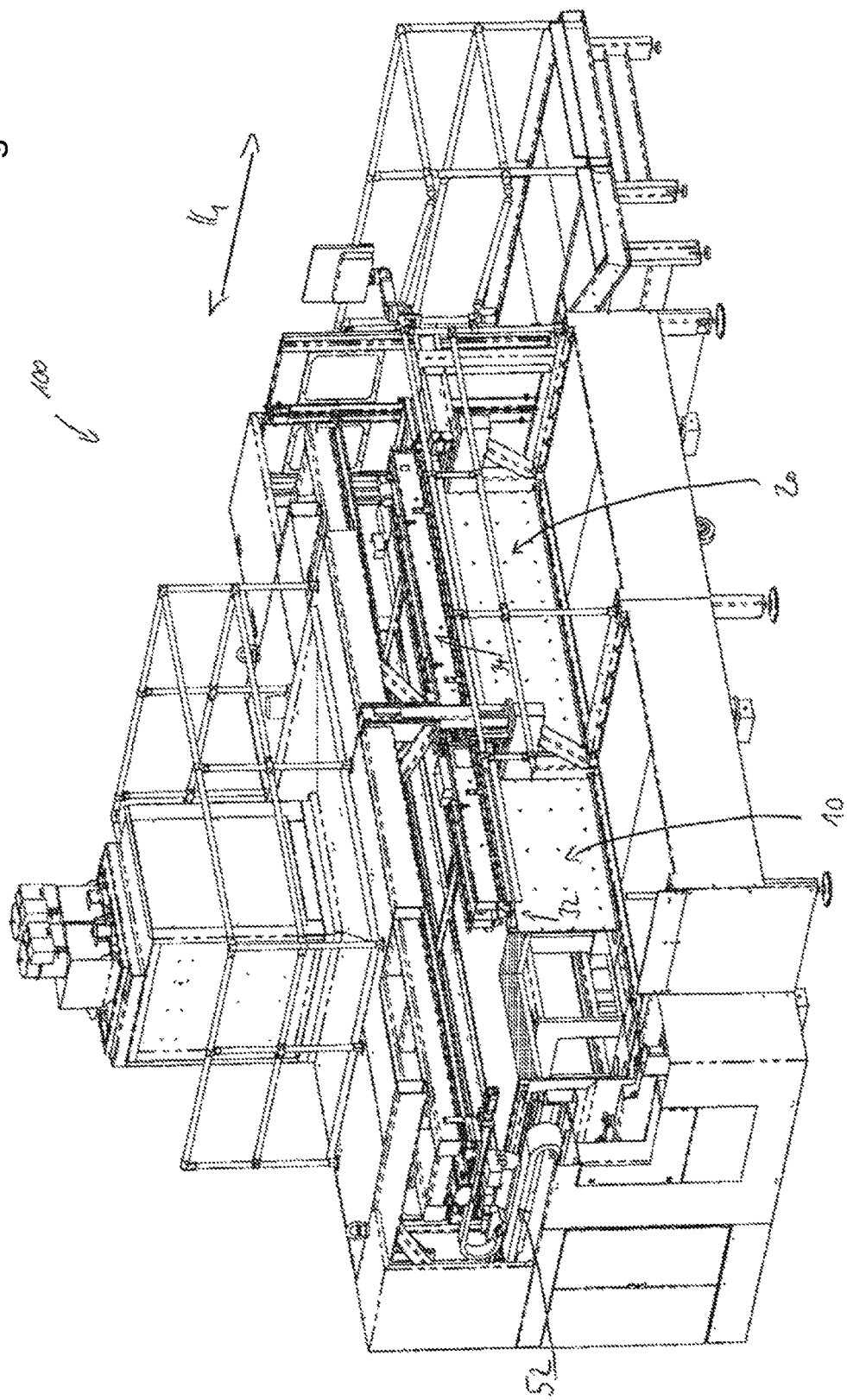

As shown in FIG. 7, the print head 52 may then be moved in the horizontal direction $H_1$ to the rear left, to align the print head 52 for a selective printing of the rear partial area of the respective construction material layer. The coating device arrangement 30 remains in its position shown in FIGS. 5 and 6.

Figure 8:
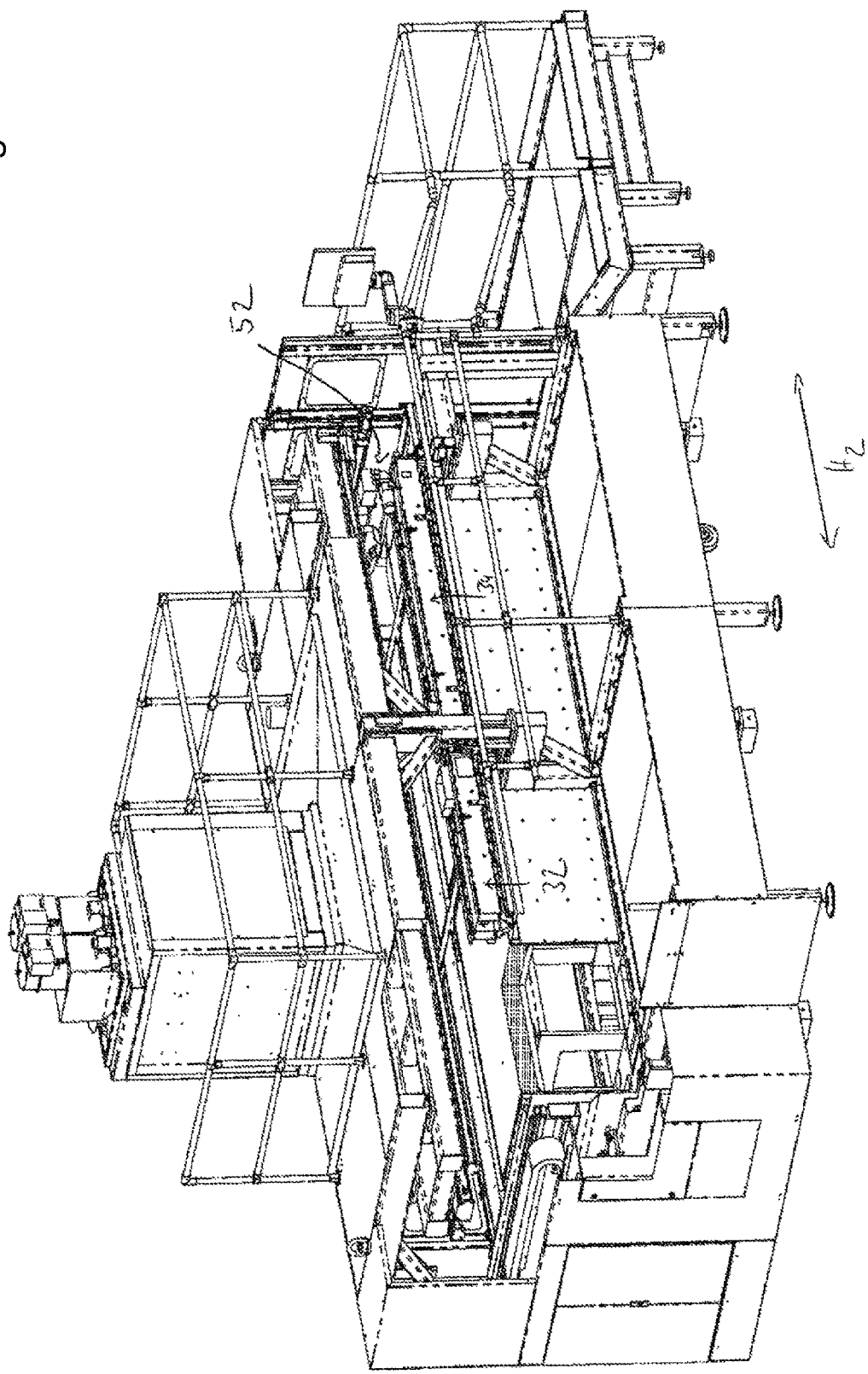

As shown in FIG. 8, the print head 52 may then be displaced in the horizontal direction $H_2$ to the rear right, to selectively supply or rather print the rear partial area (here, for example, the rear half) of the first construction material layer and a rear partial area (here, for example, the rear half) of the second construction material layer with treatment agent one after the other. The coating device arrangement 30 still remains in its position shown in FIGS. 5 to 7.

Consequently, a construction material layer is arranged over the entire surface in each construction space, which is selectively treated with treatment agent, the treatment agent contributing to an (immediate and/or subsequent) solidification of the particulate material in the selectively printed area.

Figure 9:
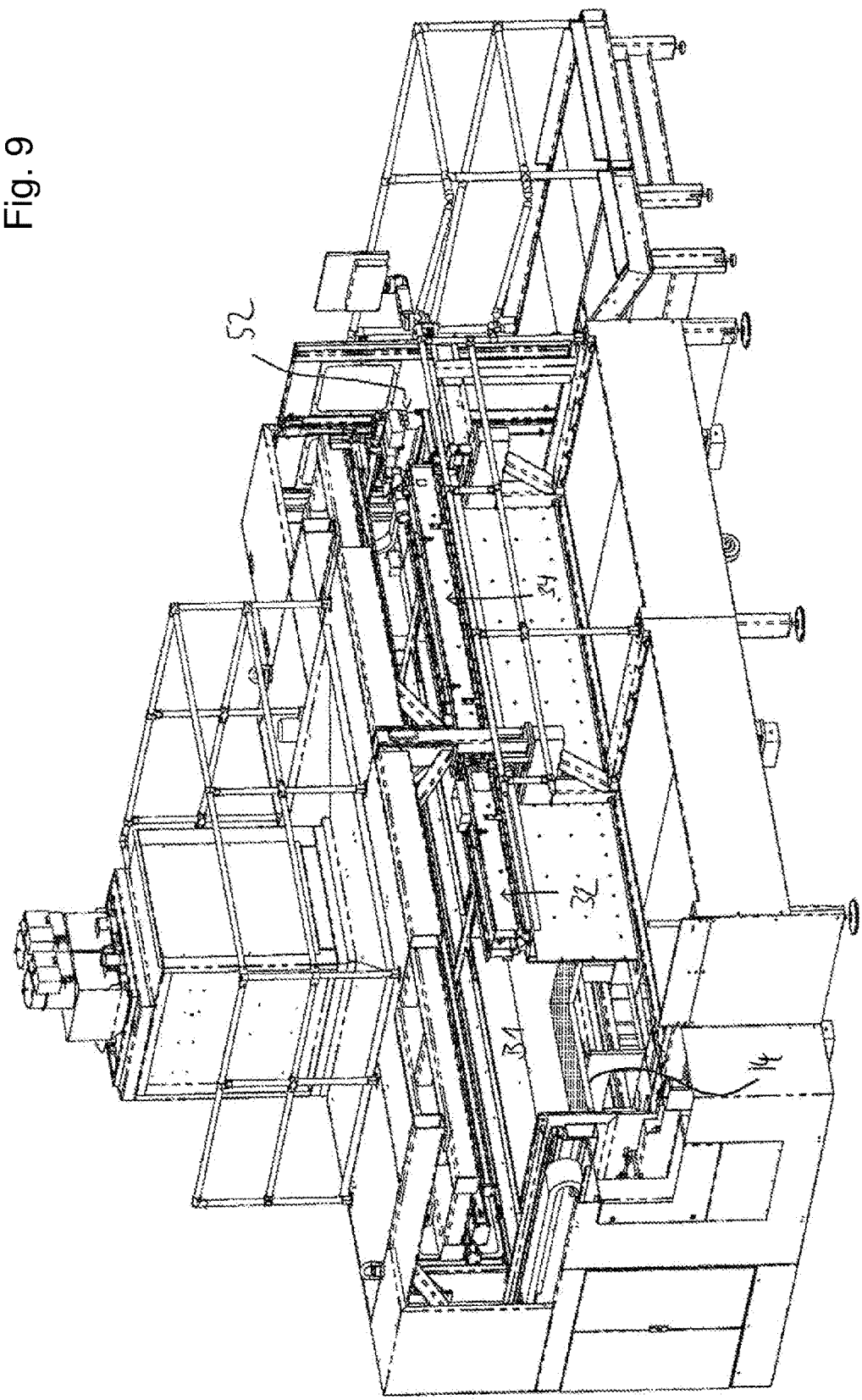

As shown in FIG. 9, the two construction platforms 14 and 24 may subsequently be lowered by another layer thickness. The coating device arrangement 30 still remains in the front position. The print head 52 has been moved from the rear right to the right front.

Figure 10:
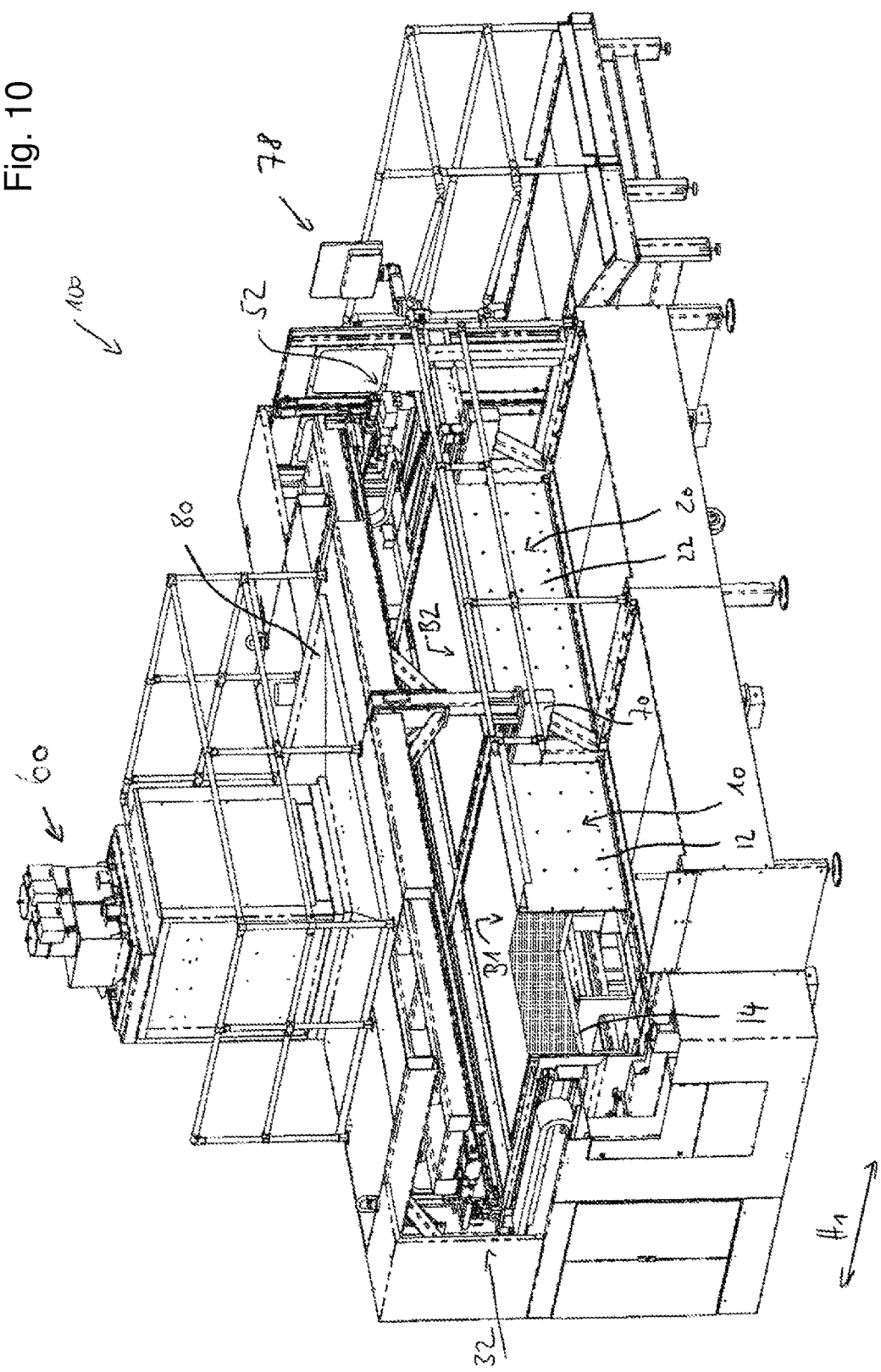

As shown in FIG. 10, the coating device arrangement 30 may then be moved to the rear in the horizontal direction $H_1$, to put down another first construction material layer on the first construction platform 14 using the first coating device 32 and to put down another second construction material layer on the second construction platform 24 using the second coating device 34. Thus, the coating device arrangement 30 is, examplarily, configured as a bidirectional coating device arrangement. The print head 52 is still arranged at the front right.

Figure 11:
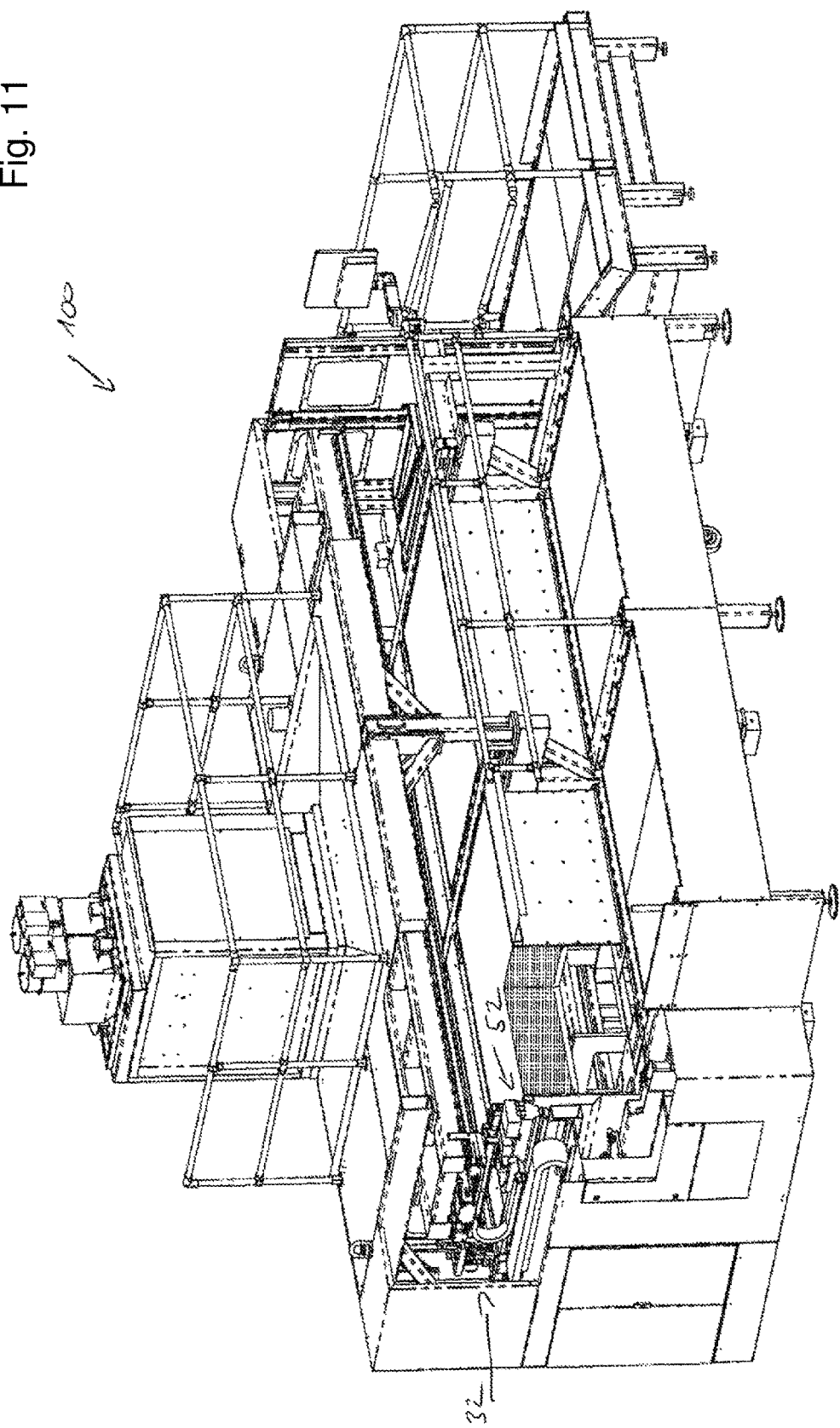

As shown in FIG. 11, the print head 52 may then be moved to the front left in the horizontal direction $H_2$, to selectively supply or rather print a front partial area (here, for example, the front half) of the another second construction material layer and a front partial area (here, for example, the front half) of the another first construction material layer with treatment agent one after the other. The coating device arrangement 30 remains in its rear position.

Figure 12:
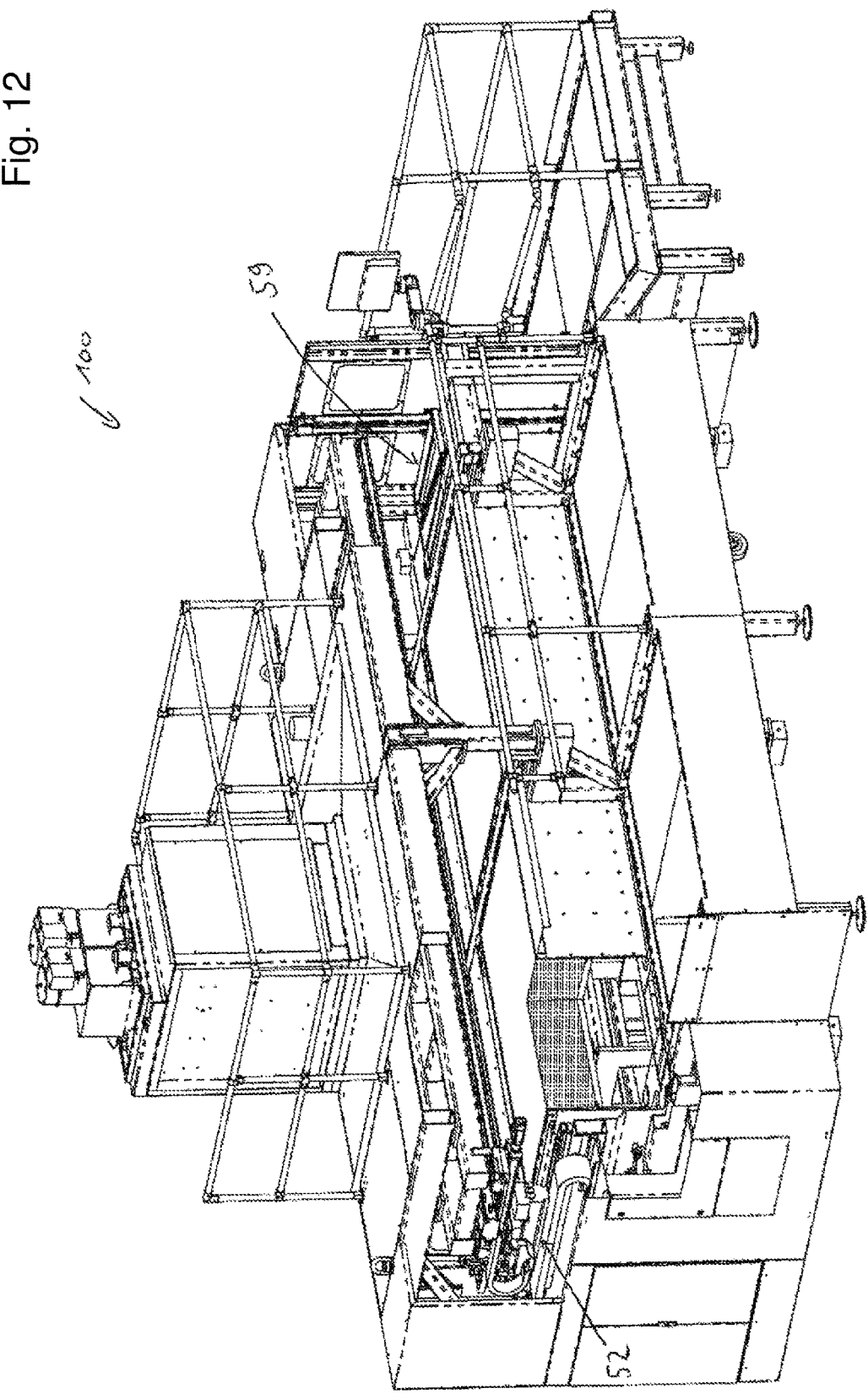

As shown in FIG. 12, the print head 52 may than be moved in the horizontal direction $H_1$ to the rear left, to align the print head 52 for a selective printing of the rear partial area of the respective another construction material layer. The coating device arrangement 30 remains in its rear position. Reference number 59 in FIG. 12 indicates an optional print head cleaning station in which the print head 52 may be cleaned prior to a construction job and/or following a construction job and/or during a construction job (for example during a coating device journey).

Figure 13:
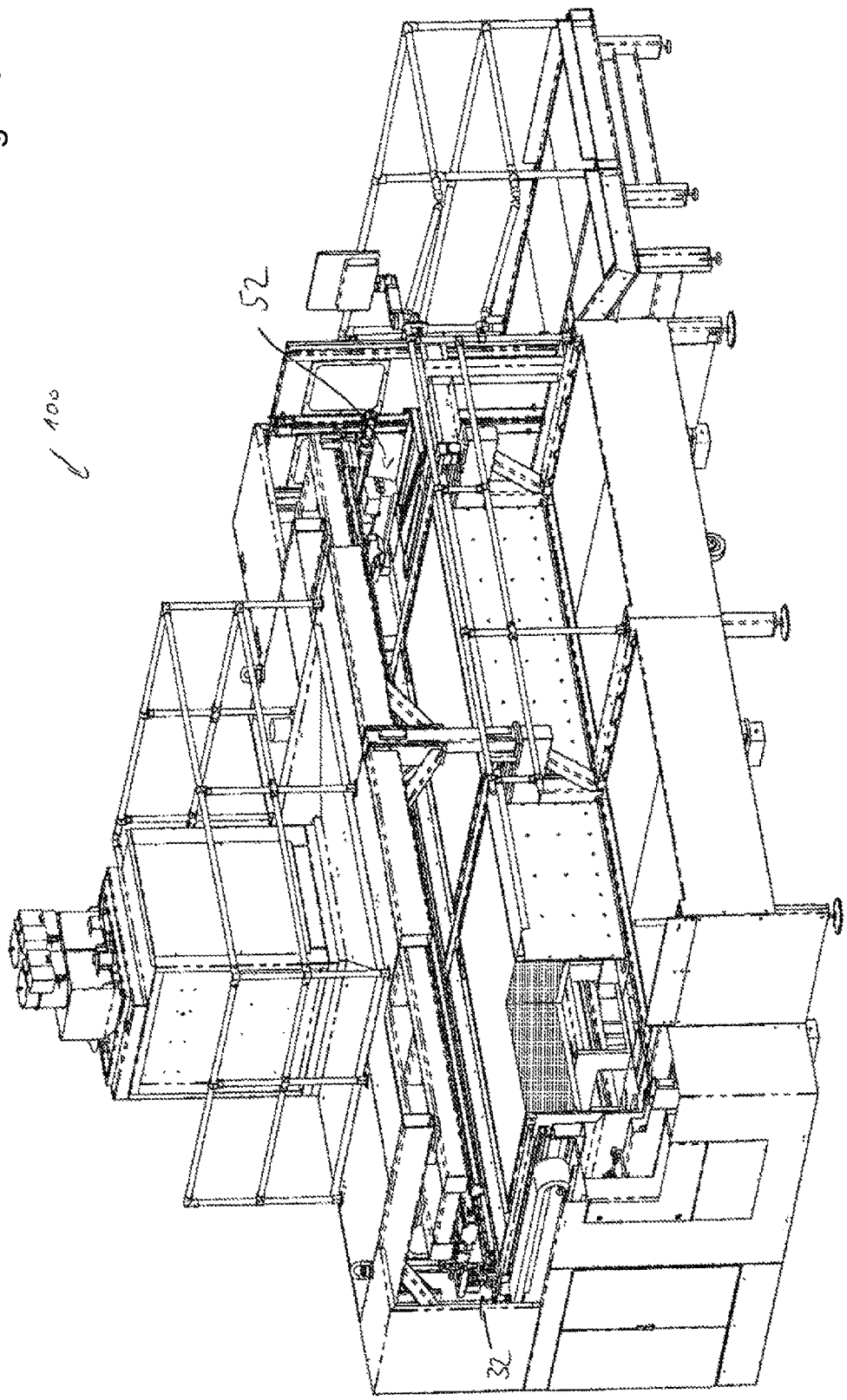

As shown in FIG. 13, the print head 52 may then be moved in the horizontal direction $H_2$ to the rear right, to selectively supply or rather print the rear partial area (here, for example, the rear half) of the another first construction material layer and a rear partial area (here, for example, the rear half) of the another second construction material layer with treatment agent one after the other. The coating device arrangement 30 remains in its rear position.

Figure 14:
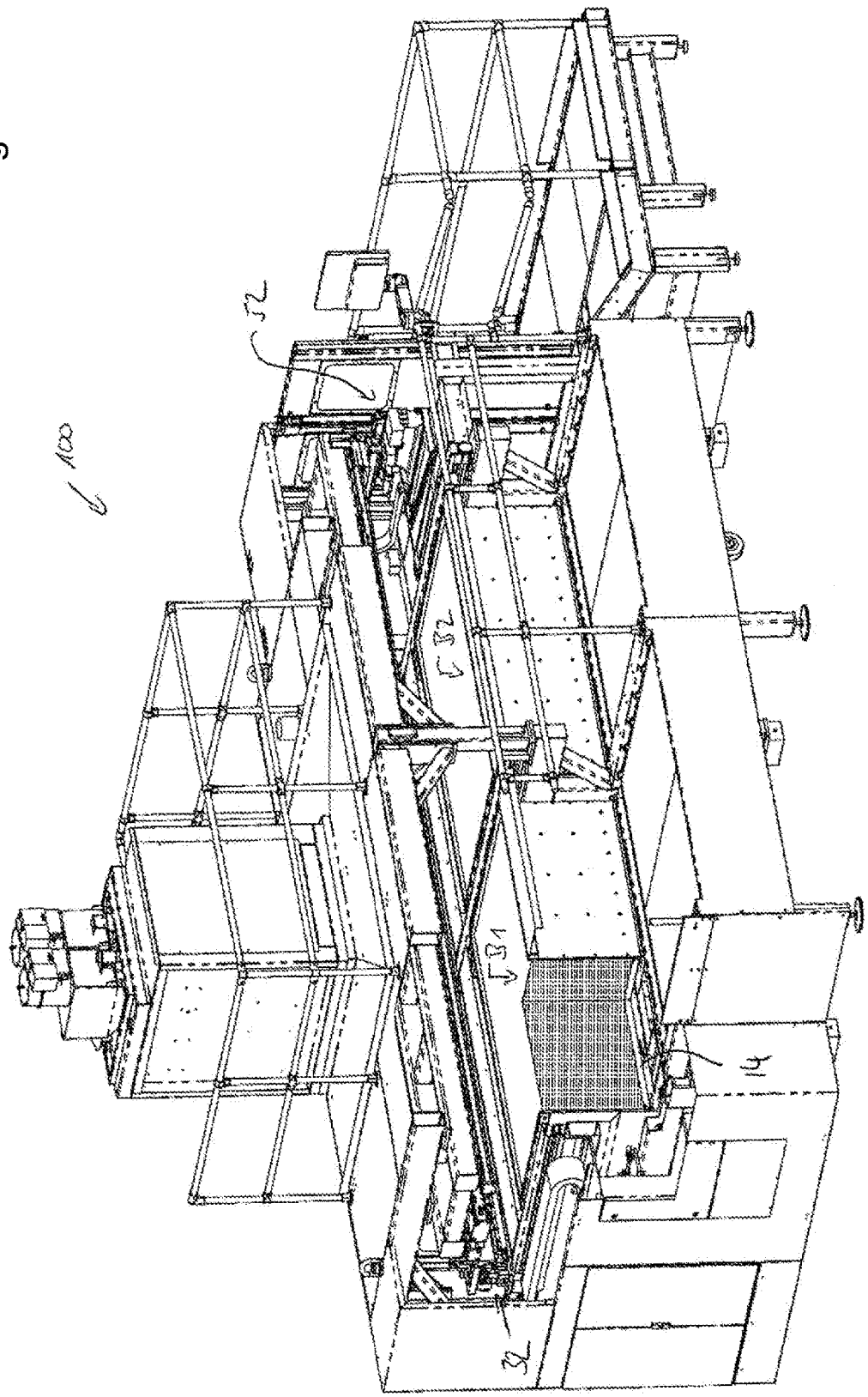

As shown in FIG. 14, the above-mentioned steps may be repeated to build up a layer stack of particulate material in the respective construction space, which respectively contains at least one component of solidified particulate material (not shown).

FIGS. 15 and 16 show a 3D printer arrangement 200 according to an embodiment of the invention.

As shown in FIGS. 15 and 16, the 3D printing arrangement 200 may comprise one or more (here by way of example two) 3D printers according to the invention, for example one or more 3D printers 100 according to the first embodiment and/or one or more 3D printers 100 according to the second embodiment.

Moreover, the 3D printer arrangement 200 may for example comprise a driverless transport system 90 for automatically charging the 3D printer 100 with construction boxes. The driverless transport system 90 may, for example, comprise a rail system 94 extending outside the 3D printer 100 on the side of the first and the second construction box insertion opening 82, 84, and along which a respective one of the first and the second construction box is displaceable. The driverless transport system 90 may, for example, further comprise a transport trolley which is movable along the rail system 94 and which is able to transport at least one construction box. For example, a first construction box may be transported to the front of the first construction box insertion opening 82 by means of the transport system 90 and may then be moved to its construction box construction position within the 3D printer by means of the first roller conveyor 16 (or an alternative construction box feeding device), in which position a first construction space is defined by the first construction box. Analogously, a second construction box may be transported to the front of the second construction box insertion opening 84 by means of the transport system 90, and may then be displaced into its construction box construction position within the 3D printer by means of the second roller conveyor 26 (or an alternative construction box feeding device). In this respect, FIG. 16 shows a state in which (only) the first construction box is moved into its construction position. The described construction box charging process for the first and the second construction box may, for example, be performed in a fully automated manner.

As shown in FIGS. 15 and 16, one or more optional components 110, 120, 130 may be provided along the transport system, which are connected to the 3D printer 100 by the driverless transport system.

The optional components may comprise an optional construction box stock 110 in which one or more (here by way of example two) construction boxes are kept, and/or an optional microwave oven 120 into which a construction box may be moved, for example to further solidify the manufactured components received therein, and/or an optional unpacking station 130 where a component may be unpacked from the particulate material fill of unsolidified construction material containing the component (for example in an automated manner). The unpacked components may, for example, be stocked in an optional component stock 140, for example in the form of a shelf.

As further shown in FIGS. 15 and 16, if the 3D printer arrangement 200 comprises a first 3D printer 100 and a second 3D printer 100', the first and the second 3D printer 100, 100' may be arranged on opposite sides in such a way that the first and the second construction box insertion opening 82, 84 of the first 3D printer 100 and the first and the second construction box insertion opening 82', 84' of the second 3D printer 100' face each other and the driverless transport system 90 extends between the first and the second 3D printer, so that the first and the second 3D printer can be charged with respective construction boxes by the driverless transport system. In this case, the driverless transport system 90 may be referred to as a common driverless transport system, as it is used by both 3D printers 100, 100'.

Figure 17:
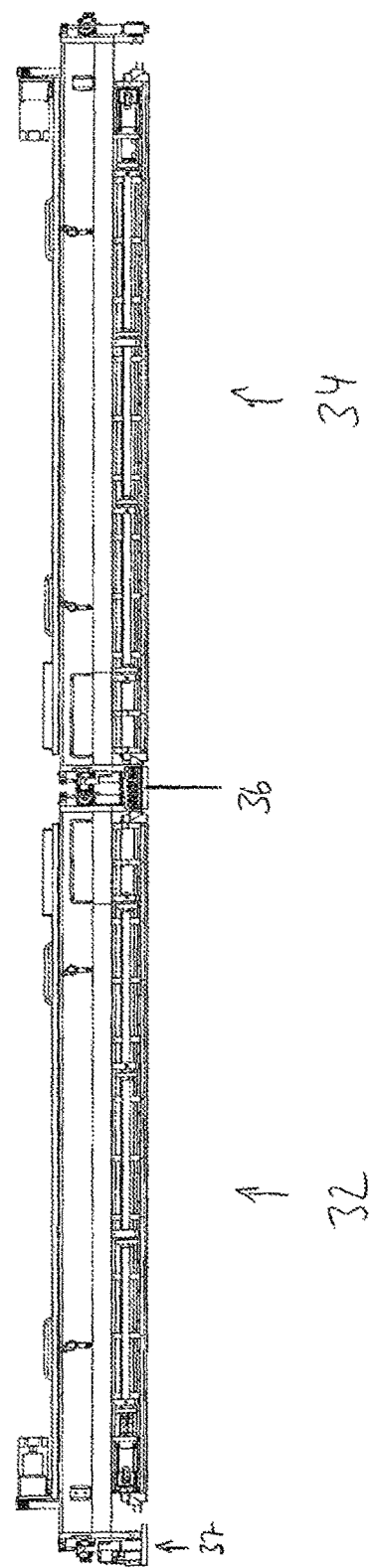
FIG. 17 shows a possible configuration of a coating device arrangement for use in a 3D printer according to the invention.

FIG. 17 shows a possible configuration of a coating device arrangement 30 for use in a 3D printer according to the invention. The coating device arrangement 30 may, for example, be used in the 3D printer 100 according to the first embodiment and/or in the 3D printer 100 according to the second embodiment.

As shown in FIG. 17, the coating device arrangement 30 comprises a first coating device 32 and a second coating device 34 separate therefrom. The first coating device 32 may be assigned to a first construction space (not shown), for example may span the longitudinal extension thereof, and the second coating device 34 may be assigned to a second construction space (not shown), for example may span the longitudinal extension thereof.

The coating device arrangement 30 may, for example be arranged in a 3D printer in a way to be displaceable across the first and the second construction space in a first horizontal direction, to supply the first and the second construction space with the construction material to be solidified in the form of a respectively uniform construction material layer. For this purpose, the first coating device 32 and the second coating device 34 may be guided in parallel, to be displaceable across their associated construction area parallel to each other in the first horizontal direction. It is basically possible to move the first coating device 32 and the second coating device 34 independent of each other or to move them across the construction field together. The latter alternative is illustrated in FIG. 17 and will be described in detail below.

The first and the second coating device 32, 34 are each configured as so-called container coating devices, i.e. they comprise a respective container which is displaceable across an associated construction space and defines an inner cavity for receiving particulate construction material, which leads to an opening for outputting the particulate construction material to the construction field or the construction space.

As shown, the first and the second coating device 32, 34 may for example be formed to be elongate. In other words, the first and the second coating device 32, 34 may be configured as so-called slot coating devices. The length of the (discharge) slot of the respective coating device may be greater than or equal to the related construction space length in this regard.

As shown, the first coating device 32 and the second coating device 34 may, for example, be firmly connected to each other, for example by a common connection plate 36, such that they are displaceable across the first construction space and the second construction space, respectively, together.

In this respect, the common connection plate 36 may, for example, be fixed to a linear guiding structure (not shown), for example may be supported thereby, for example on a slide of the linear guiding structure. The linear guiding structure itself may, for example, be fixed to a frame structure (not shown). The respective coating device may, for example, be fixed to another linear guiding structure at its free longitudinal end. For example, the first coating device 32 may be fixed with the plate 37 to a second linear guiding structure. The second coating device 34 may be fixed to a third linear guiding structure in the same way.

Figure 18:
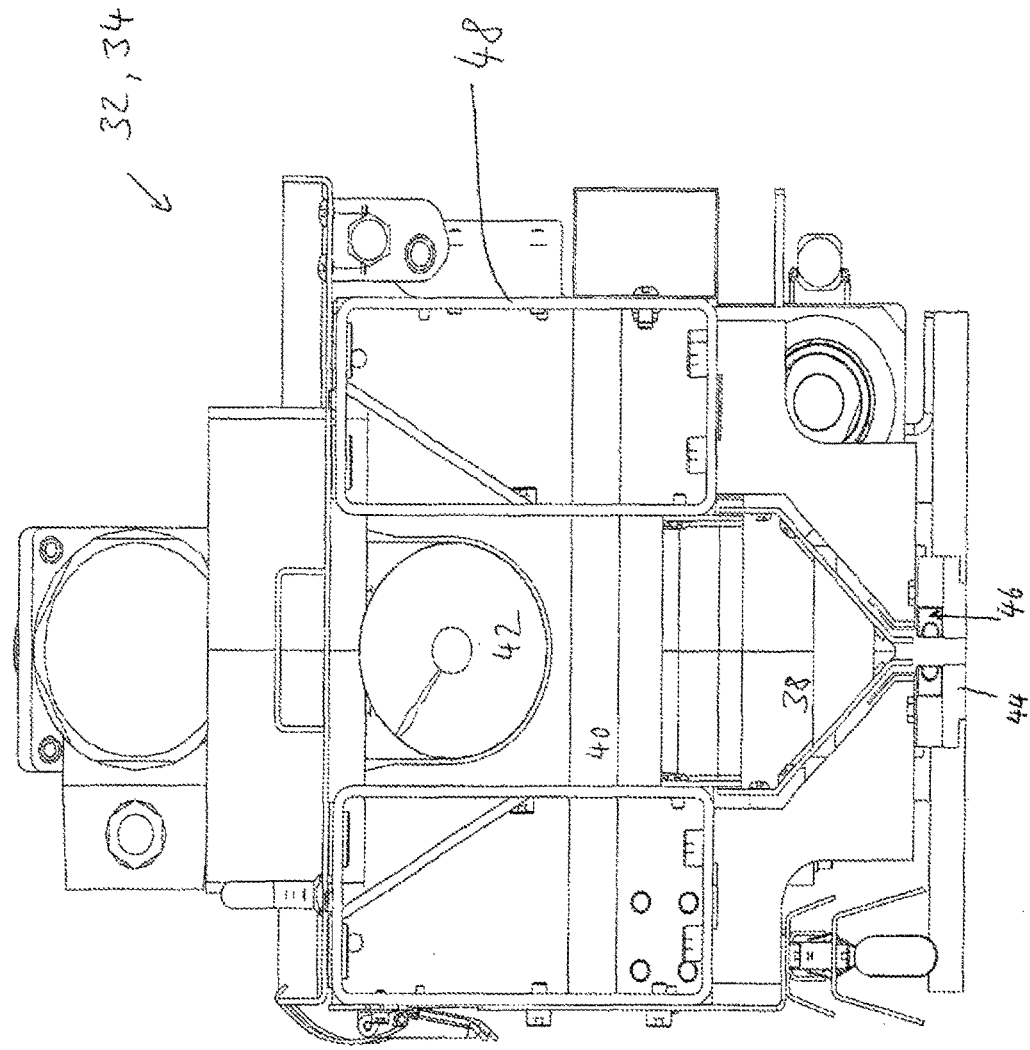
FIG. 18 shows a cross-sectional view through a coating device for use in the coating device arrangement according to FIG. 17.

FIG. 18 shows a cross-sectional view through a coating device for use in the coating device arrangement 30 of FIG. 17 and for use in a 3D printer according to the invention, respectively, for example in the 3D printer 100 according to the first embodiment and/or in the 3D printer 100 according to the second embodiment.

The coating device shown may be used as the first and/or the second coating device of a coating device arrangement, which is the reason why reference numbers 32 and 34 have been indicated in FIG. 18.

As shown, the coating device 32, 34 may comprise a container 38 which defines an inner cavity for receiving particulate construction material, which leads to an opening for outputting the particulate construction material. The container 38 may, for example, be connected to a carrier structure 48 or may be fixed thereto.

A so-called supply container 40 may, for example, be provided above the container 38, which supplies the (lower) container 38 with particulate construction material. A distribution device 42, here by way of example in the shape of an auger/screw, may be provided in the supply container 40, which distributes the particulate construction material fed to the supply container 40 in the supply container 40. The supply container itself may, for example, be supplied with construction material by a coating device feeding device, for example by the coating device feeding device 60 of FIG. 4. For this purpose, the coating device may, for example, be moved into a so-called coating device filling position within a 3D printer, in which position it is supplied with construction material by the coating device feeding device.

For example, a closing device 46 may respectively be attached to the coating device 32, 34, which is configured to selectively close the opening for outputting the particulate construction material. A closing device of this type may, for example, comprise one or more (here by way of example two) elongate hollow bodies with a respective expansion portion, where the elongate hollow body may be expanded by supplying a pressure fluid into the cavity of the hollow body, the expansion of the hollow body at the expansion portion contributing to closing the opening. The expansion portion of the respective hollow body is by way of example curved inwards in FIG. 18, the opened state of the closing device being shown in FIG. 18, in which the opening of the container is exposed. The two expansion portions deform outward and toward each other by the supply of a pressure fluid into the respective hollow body, to thereby cover/close the opening of the container. Alternatively, the closing device 46 may, for example, be configured as a slider or gate valve device.

The opening of a respective coating device may, for example, be selectively closed by means of the closing device (for example in a controlled way, i.e. by a control unit), in order to avoid a discharge of particulate material during an acceleration portion/acceleration ramp in front of the construction area and/or a deceleration portion behind the construction area when the coating device travels across the associated construction area, and/or to selectively "switch off" or close one of the coating devices upon completion of the construction job assigned thereto. In the embodiment of the coating device arrangement 30 shown in FIG. 17, the switched-off coating device still travels along with the active coating device, the construction job of which has not been finished yet, but a discharge of particulate material from the inactive coating device is avoided by means of the closing device.

As further shown in FIG. 18, one or more (here by way of example two) stroking members 44 may be attached to the coating device 32, 34, which are configured to stroke particulate construction material discharged from the opening, to thereby level and/or compress the discharged particulate material. Attaching two stroking members 44 allows to operate the coating device as a bidirectional coating device which is able to apply uniform layers of construction material in both directions (journey and return journey). The respective stroking member 44 may, for example, be made of metal, for example steel, and/or may have an elongate shape, and/or may be configured as a blade, and/or may comprise a substantially planar, lower surface, by means of which the discharged particulate material may be leveled and/or compressed.

The previous description of specific exemplary embodiments has been presented for the purpose of illustration and description. It is not intended to be exhaustive or to limit the invention to the exact forms disclosed, and it is to be understood that various modifications and variations are possible in the light of the teaching disclosed herein. The scope of protection is defined by the attached claims and their equivalents.

The invention claimed is:

1. A 3D printer (100) which is configured to build up a three-dimensional component in layers by forming layers of particulate construction material lying one upon the other and by selectively solidifying a partial region of the respective construction material layer, and which is configured to build up one or more first three-dimensional components in a first construction space (B1) which is arranged in the 3D printer, and simultaneously one or more second three-dimensional components in a second construction space (B2) which is arranged adjacent to the first construction space at a horizontal distance therefrom in the 3D printer, having a coating device arrangement (30) which is displaceable across the first and the second construction space (B1, B2) in a first horizontal direction ($H_1$), to supply the first and the second construction space with construction material in the form of a respectively uniform construction material layer of the construction material to be solidified, wherein the first construction space (B1) and the second construction space (B2) have two long sides and two short sides in top view, and wherein the first and second construction spaces are arranged adjacent to one another along a respective short side, characterized in that:

the first horizontal direction ($H_1$) is perpendicular to the long sides and/or parallel to the short sides, and through a common printing device (50) which is displaceable across the first and the second construction space (B1, B2) in a second horizontal direction ($H_2$), to selectively solidify a partial region of a previously applied construction material layer of the respective construction space by a controlled output of a flowable treatment agent, wherein the second horizontal direction ($H_2$) is perpendicular to the first horizontal direction ($H_1$) and/or perpendicular to the short sides and/or parallel to the long sides, wherein the common printing device (50) comprises a common printing head (52) having one or more printing nozzles, which is configured to serve both the first construction space (B1) and the second construction space (B2), and wherein the coating device arrangement (30) comprises a first coating device (32) which is assigned to the first construction space (B1) and a second coating device (34) separate therefrom, which is assigned to the second construction space (B2).

2. A 3D printer (100) according to claim 1 further having a first construction platform (14) and a second construction platform (24),
wherein the 3D printer (100) is configured to receive the first construction platform (14) and the second construction platform (24) simultaneously in a respectively associated first and second construction platform construction position, respectively, which are separate from each other, in which the respective construction platform is arranged within the 3D printer and in which the first construction space is arranged above the first construction platform and the second construction space is arranged above the second construction platform.

3. A 3D printer (100) according to claim 1 further having a first construction box (10) and a second construction box (20),
wherein the 3D printer (100) is configured to receive the first construction box (10) and the second construction box (20) simultaneously in a respectively associated first and second construction box construction position, respectively, which are separate from each other, in which the respective construction box is arranged within the 3D printer for building up the respectively at least one component by means of the 3D printer in the first and the second construction space, respectively, defined by the first and the second construction box, so that respectively one or more components may be built up in layers simultaneously in the first construction box (10) and the second construction box (20) using the 3D printer (100).

4. A 3D printer (100) according to claim 3 wherein the first construction box (10) and/or the second construction box (20) comprise a peripheral wall structure (12, 22) extending in a vertical direction, which delimits a respective construction box interior space, wherein a first and a second construction platform (14, 24), respectively, extending in a horizontal direction, is received in the respective construction box interior space.

5. A 3D printer (100) according to claim 2 wherein the first construction platform (14) and/or the second construction platform (24) are height-adjustable, so that the respective construction platform may be lowered gradually for building up a component.

6. A 3D printer (100) according to claim 1 wherein each short side of the first construction space (B1) and/or of the second construction space (B2) has a dimension of less than or equal to 2 m.

7. A 3D printer (100) according to claim 2 wherein the first and/or the second construction platform (14, 24) or construction box (10, 20) are displaceable between their respective construction position and an additional position in which the respective construction platform or construction box is arranged outside the 3D printer.

8. A 3D printer (100) according to claim 1 wherein the first coating device (32) and/or the second coating device (34) respectively comprise a container (38) which defines an inner cavity for receiving particulate construction material, which leads to an opening for outputting the particulate construction material, wherein a closing device (46) is respectively attached to the first coating device (32) and/or the second coating device (34), which is configured to selectively close the opening for outputting the particulate construction material, and/or wherein a stroking member (44) is respectively attached to the first coating device (32) and/or the second coating device (34), which is configured to stroke particulate construction material outputted from the opening, to thereby level and/or compress the output particulate material, and/or the first coating device (32) and the second coating device (34) are connected to each other in a fixed way, to be displaceable together across the first construction space (B1) and the second construction space (B2), respectively.

9. A 3D printer (100) according to claim 1 wherein the common printing head (52) has a treatment agent output area formed by the printing nozzles, a dimension of which corresponds to a portion of the entire length of a respective short side, and/or is arranged in a vertical direction at a distance from the first coating device (32) and the second coating device (34), and is displaceable horizontally in a separate horizontal plane.

10. A 3D printer (100) according to claim 1 further having a common coating device feeding unit (60) integrated in the 3D printer, which is arranged in a vertical direction above the first and the second coating device (32, 34), and/or by which both the first and the second coating device (32, 34) can be supplied with construction material by a feeding structure split in several parts and/or comprising a common mixing unit wherein construction material prepared in the mixing unit can be fed to the first and the second coating device (32, 34) by a feeding structure split in several parts when on or the other of the first and the second coating device (32, 34) is moved into a respective filling position.

11. A 3D printer (100) according to claim 1 further having a common frame structure (70) in which both the first construction space (B1) and the second construction space (B2) are arranged, and/or a common housing (80) in which both the first construction space (B1) and the second construction space (B2) are arranged.

12. A 3D printer (100) according to claim 1 wherein the 3D printer comprises a first and a second construction box insertion opening (82, 83) which are provided on a common side of the 3D printer.

13. A 3D printer arrangement (200) comprising:
(a) a 3D printer (100) which is configured to build up a three-dimensional component in layers by forming layers of particulate construction material lying one upon the other and by selectively solidifying a partial region of the respective construction material layer, and which is configured to build up one or more first three-dimensional components in a first construction space (B1) which is arranged in the 3D printer, and simultaneously one or more second three-dimensional components in a second construction space (B2) which is arranged adjacent to the first construction space at a horizontal distance therefrom in the 3D printer, having a coating device arrangement (30) which is displaceable across the first and the second construction space (B1, B2) in a first horizontal direction ($H_1$), to supply the first and the second construction space with construction material in the form of a respectively uniform construction material layer of the construction material to be solidified, wherein the first construction space (B1) and the second construction space (B2) have two long sides and two short sides in top view, and wherein the first and second construction spaces are arranged adjacent to one another along a respective short side, characterized in that:

the first horizontal direction ($H_1$) is perpendicular to the long sides and/or parallel to the short sides, and through a common printing device (50) which is displaceable across the first and the second construction space (B1, B2) in a second horizontal direction ($H_2$), to selectively solidify a partial region of a previously applied construction material layer of the respective construction space by a controlled output of a flowable treatment agent, wherein the second horizontal direction ($H_2$) is perpendicular to the first horizontal direction ($H_1$) and/or perpendicular to the short sides and/or parallel to the long sides, wherein the common printing device (50) comprises a common printing head (52) having one or more printing nozzles, which is configured to serve both the first construction space (B1) and the second construction space (B2), and wherein the coating device arrangement (30) comprises a first coating device (32) which is assigned to the first construction space (B1) and a second coating device (34) separate therefrom, which is assigned to the second construction space (B2); and (b) a driverless transport system (90) for automatically charging the 3D printer (100) with construction boxes (10, 20), wherein the driverless transport system (90) comprises a rail system (94) extending outside the 3D printer (100) on the side of the first and the second construction box insertion opening (82, 84) and along which a respective one of the first and the second construction box (10, 20) is displaceable.

14. A 3D printer arrangement (200) according to claim 13 further having a first and a second 3D printer (100, 100') according to claim 12 wherein the first and the second 3D printer (100, 100') are arranged on opposite sides in such a way that the first and the second construction box insertion opening (82, 84) of the first 3D printer (100) and the first and the second construction box insertion opening (82', 84') of the second 3D printer (100') face each other and the driverless transport system (90) thereof extends between the first and the second 3D printer, so that the first and the second 3D printer can be charged with respective construction boxes by the common driverless transport system.

15. A generative manufacturing process, where one or more three-dimensional components are respectively built up in layers in a respective construction job simultaneously in a first construction space (B1) and a second, adjacent construction space (B2) of a common 3D printer (100) comprising the steps of:

forming layers of particulate construction material lying one upon the other, and selectively solidifying a partial region of the respective construction material layer in the respective construction space, wherein the first construction space (B1) is arranged above a first construction platform (14) and the second construction space (B2) is arranged above a second construction platform (24), and/or the first construction space (B1) is defined by a first construction box (10) and the second construction space (B2) is defined by a second construction box (20), and/or the common printing head travels across the first and the second construction space in a meandering pattern, and/or the common printing head (52) is displaced in a first horizontal plane and both coating devices (32, 34) are displaced in a second horizontal plane which is arranged at a vertical distance from the first horizontal plane and is located underneath the same, and/or the printing head (52) is displaced at a higher speed than the respective coating device (32, 34), and/or the first construction space (B1) and the second construction space (B2) are accommodated in a common housing (80), and/or the first construction space (B1) and the second construction space (B2) are arranged in a common frame structure (70), and/or the first coating device (32) and the second coating device (34) are charged with construction material by a common coating device feeding unit (60).

* * * * *